(12) United States Patent
Moggridge et al.

(10) Patent No.: US 12,271,004 B2
(45) Date of Patent: Apr. 8, 2025

(54) IMAGER AND SPOT SAMPLER WITH TRANSLATABLE STAGE

(71) Applicant: Westboro Photonics Inc., Ottawa (CA)

(72) Inventors: Timothy Moggridge, Victoria (CA); Chad Greene, Ottawa (CA)

(73) Assignee: Westboro Photonics Inc., Ottawa (CA)

( * ) Notice: Subject to any disclaimer, the term of this patent is extended or adjusted under 35 U.S.C. 154(b) by 0 days.

(21) Appl. No.: 18/576,249

(22) PCT Filed: Jul. 14, 2022

(86) PCT No.: PCT/CA2022/051101
§ 371 (c)(1),
(2) Date: Jan. 3, 2024

(87) PCT Pub. No.: WO2023/283742
PCT Pub. Date: Jan. 19, 2023

(65) Prior Publication Data
US 2024/0264454 A1 Aug. 8, 2024

Related U.S. Application Data

(60) Provisional application No. 63/221,758, filed on Jul. 14, 2021.

(51) Int. Cl.
*H04N 23/55* (2023.01)
*G01J 3/02* (2006.01)
(Continued)

(52) U.S. Cl.
CPC ............ *G02B 27/108* (2013.01); *G01J 3/021* (2013.01); *G01J 3/0218* (2013.01); *G01J 3/0237* (2013.01);
(Continued)

(58) Field of Classification Search
CPC .. G01J 2003/1213; G01J 3/0208; G01J 3/021; G01J 3/0218; G01J 3/0237;
(Continued)

(56) References Cited

U.S. PATENT DOCUMENTS 3,799,680 A 3/1974 Weisner
3,813,172 A 5/1974 Walker
(Continued)

FOREIGN PATENT DOCUMENTS

WO 2017015077 1/2017

OTHER PUBLICATIONS

Gerardo Avila, Linking a Telescope to a Spectrograph Through an Optical Fibre; ovejabiennegra; Dec. 30, 2010, https://spectroscopy.wordpress.com/2010/12/30/linking-a-telescope-to-a-spectrograph-through-an-optical-fibre-part-ii/.
(Continued)

*Primary Examiner* — Jae N Noh
(74) *Attorney, Agent, or Firm* — Damien G. Loveland

(57) ABSTRACT

Optical devices that combine imaging with spectral detection usually require bulky or expensive optics or are limited in the spectral measurements that can be made. The disclosed device uses a lens and mirror to provide two image planes: one for a pixelated detector and the other for an optical fiber assembly. The optical fiber assembly may be scanned over most or all of the field of view, or this may be achieved with a fixed fiber assembly and translatable mirror. Multiple fibers may be included in the assembly and multiple measurement or other devices may be connected to the remote ends of the optical fibers.

45 Claims, 16 Drawing Sheets

(51) Int. Cl.
  *G01J 3/28*    (2006.01)
  *G02B 7/00*    (2021.01)
  *G02B 27/10*   (2006.01)
  *H04N 17/00*   (2006.01)
  *G02B 6/42*    (2006.01)

(52) U.S. Cl.
  CPC .......... *G01J 3/0243* (2013.01); *G01J 3/2823* (2013.01); *G02B 7/006* (2013.01); *H04N 17/002* (2013.01); *H04N 23/55* (2023.01); *G02B 6/4298* (2013.01)

(58) Field of Classification Search
  CPC .......... G01J 3/0243; G01J 3/12; G01J 3/2823; G02B 26/008; G02B 27/108; G02B 6/4298; G02B 7/006; H04N 17/002; H04N 23/55
  See application file for complete search history.

(56) References Cited

U.S. PATENT DOCUMENTS

| | | |
|---|---|---|
| 4,279,507 A | 7/1981 | Bulpitt |
| 8,482,652 B2 | 7/2013 | Kreysar |
| 9,909,920 B2 | 3/2018 | Izaki |
| 2009/0040519 A1* | 2/2009 | Zhang .................. G01J 3/02 356/302 |
| 2015/0077842 A1* | 3/2015 | Kleppe .............. G02B 21/0072 359/380 |
| 2017/0052334 A1 | 2/2017 | Graves et al. |
| 2022/0146309 A1 | 5/2022 | Nakatani |
| 2023/0341222 A1* | 10/2023 | Vakoc .................. G01B 9/0201 |

OTHER PUBLICATIONS

Sabyasachi Chattopadhyay, Fiber positioning in microlens-fiber coupled integral field unit, Jun. 27, 2020, Journal of Astronomical Telescopes, Instruments, and Systems, vol. 6, Issue 2, 025002 (Jun. 2020). https://doi.org/10.1117/1.JATIS.6.2.025002.

Eldred F. Tubbs, Multiple Object Fiber Optics Spectrograph Feed for the Hale Telescope, Nov. 16, 1982, Proceedings vol. 0331, Instrumentation in Astronomy IV; (1982) https://doi.org/10.1117/12.933468 Event: 1982 Astronomy Conferences, 1982, Tucson, United States.

K-band Multi Object Spectrograph, European Southern Observatory, Dec. 2012, https://www.eso.org/public/teles-instr/paranal-observatory/vlt/vlt-instr/kmos/.

How to obtain a 3D view of a whole galaxy in one shot, European Southern Observatory,, https://www.eso.org/public/france/teles-instr/technology/ifu/?lang.

* cited by examiner

IMAGER AND SPOT SAMPLER WITH TRANSLATABLE STAGE

FIELD OF THE INVENTION

This invention is in the field of optical detection instruments. In particular, it relates to an imaging camera combined with a spot sampler for optical measurements of an imaged scene.

BACKGROUND OF THE INVENTION

There are many imaging spectrometers on the market to measure the spectrum of light emitted, reflected or transmitted from a surface. There are spot spectrometers that can measure only one location in the field of view. There are also hyperspectral and multispectral imagers that can measure a spectrum or select spectral components at thousands or millions of locations in the field of view, but their measurement attributes, stray light, dynamic range, cost or speed may not be suitable for some applications.

The optical combination of a spectroradiometer and imaging camera (or eyepiece) has been in use for many years and has been realized using a few common methods.

A first example is where a beam splitting cube is placed in the camera's optical path providing two focal planes; one for the camera and one for a fiber spectroradiometer. See, for example, Westboro Photonics WP100™ and WP214™ commercial products. Westboro Photonics WP214 (FIG. 1) is an imaging colorimeter with integrated spectroradiometer, commercially available from 2014. From left to right: object plane 11; imaging objective 12; first focal plane 13; collimating relay lenses 14, 17; beam-splitting cube 15; optical filters 16; focal plane with monochrome, unfiltered CCD (charge-coupled device) sensor 18. From beam-splitting cube and down: relay lens 19; focal plane 20 with fiber optic spectrometer 21. The instrument is calibrated to measure chromaticity from a sequence of images using a plurality of filters 16 sequentially positioned into the beam path and forming an image at the CCD sensor 18. A correction to the measured chromaticity is created by comparison with the color measurements from the spectroradiometer. Westboro Photonics WP100, commercially available from 2012, has the same design as FIG. 1, with the following changes: the image sensor 18 is an RGB (red-green-blue), Bayer filtered CCD sensor and there is no filter at position 16. The spectroradiometer data is used to correct the color measurements from the image sensor.

A second example uses a filter wheel populated with a tilted mirror and a number of filters. The wheel rotates and the camera sensor can image the scene through the filters, or in one position the mirror blocks the camera sensor and diverts light to focus on the fiber guide. See, for example, Radiant Vision Systems Patent No. U.S. Pat. No. 8,482,652B2, which describes a rotating mirror assembly and a fixed detector. The turning mirror is on a rotating wheel containing optical filters. No motion of the spectrometer or fiber is described.

A third example is an image forming system with a lens that has a tilted reflecting surface positioned behind it and which has a hole in it. The hole is at the confluence of the lens focus and the optical axis. Light travelling through the hole is directed to a detector. Reflected light off the mirror is imaged into a viewfinder. The reflective surface may also be a rotatable wheel with a series of holes corresponding to differently shaped measurement apertures. See, for example, U.S. Pat. Nos. 4,279,507, 3,799,680 and 3,813,172. Patent U.S. Pat. No. 4,279,507 relates to scanning a detector across a focal plane using two prisms. This design also requires collimating the light before the scanning mirror. Patents U.S. Pat. Nos. 3,799,680 and 3,813,172 describe a rotating mirror and a fixed detector. The rotating mirror has a hole in it so light may pass through the hole to the detector or reflect to the eyepiece. The operator sees a black hole in the field of view. The missing or black area is the area being sampled by the detector.

A fourth example is the Conoscope 88™ by Autronic Melchers GmbH, which in the 1990's was an instrument with a moving spectrometer that could sample the spectrum of the light at a multitude of locations across the focal plane of the primary imaging objective. FIG. 2 embodies the key elements of the Autronic Melchers Conoscope 88 optional spectrometer features. From left to right: an object plane (at external entrance pupil position) at 30; lens elements 32; an intermediate focal plane/conjugate pupil area at 34; a fiber 35 being part of a motion-controlled fiber optic spectrometer 36 that can translate and sample the spectrum at a multitude of locations in one dimension across the focal plane; a second lens assembly 38; and finally, an focal plane 40 where there exists an RGB CCD array sensor. The spectrometer measures the spectrum at many locations across the optical path and compares the measurement locations (or angles) with those measured by the RGB array sensor. The spectrum measurements are evaluated to get XYZ tristimulus data. Since this data is more accurate and reliable than XYZ data from the RGB imager, a correction (vector or matrix) is applied to the 2D imaged XYZ data so that it agrees with the spectrometer XYZ data. This can be applied as a function angle from the optical axis.

Of the four methods above, the first three describe a situation where the detector or spectroradiometer is fixed relative to the optical axis. The final method allows for scanning of the spot spectroradiometer, however it also requires a more complicated and expensive relay lens assembly.

FIG. 3 shows a prior art imaging system with objective lens 50, optical axis 52, mirror 54 with aperture at 56. The lens 50 focuses the light onto the mirror 54 at 56. The mirror may rotate and have a multitude of apertures as described in U.S. Pat. Nos. 3,799,680A and 3,813,172A. The detector 62 or fiber guide at image plane 60 samples the light that passes through aperture 56 and focusing lens 58. Light reflected off the mirror 54 is focused by lens 64 onto an eyepiece 66 or to a pixelated detector. If the surface of the mirror 54 had a mirrored spot at 56 and was transparent elsewhere, then the detector 62 and imager 66 positions could be swapped.

In another instance of prior art, in the device in FIG. 3, the mirror 54 may be moveable into the optical path or removed from the optical path via some motion. In this way, if the mirror is 100% reflective, all the light goes to either the detector 62 (fiber assembly) through lens assembly 58 or to the pixelated sensor 66 through lens assembly 64. The mirror 54 may also be moveable and have various apertures in it to select which fibers in the fiber assembly are able to collect light. If no image is formed at 56, then the focusing optical elements at 64 and 58 may not be needed.

SUMMARY OF THE INVENTION

In one embodiment, this invention provides a relatively cost-effective method to enable one or a plurality of spectral measurements over an imager's field of view using a single, fiber-based spectrometer, without moving the spectrometer or the sample. The invention disclosed herein includes an imaging apparatus that has a lens, a two-dimensional (2D) photodetector array with CCD, CMOS (complementary metal-oxide semiconductor), InGaAs, HgCdTe, quantum dot or similar sensors, and an optical fiber and turning mirror assembly. The turning mirror and optical fiber may be assembled so that they each may be translated separately, or together in one or more planes such that the tip (i.e. entrance face) of the fiber assembly is in the focal plane of the lens.

In some embodiments of the invention the method proposed herein differs from some of the prior art methods above in that both (a) the spectrometer is scanning one or a multitude of the same areas as the sensor is imaging and (b) there is no intermediate focal plane.

As compared to a traditional spot spectrometer, this invention may allow the spectral measurement spot to be translated in the scene quickly and accurately. The invention may also be more economical when compared to the use of external mechanical positioning equipment. The invention can be configured with a multitude of fibers and measurement instruments. The fibers may be translated to present the multiple instruments at the same focus location(s) so that a larger data set can be acquired at a particular position to acquire measurements from those instruments at identical locations. Unlike beam-splitters used in some spot spectrometers, the invention can use 100% reflectance mirrors for maximum signal strength in the measurement. Everything else being equal, a mirror-based arrangement is able to measure lower light levels than a beam splitter.

Disclosed is an optical device comprising: one or more lenses providing an image focal plane; a mirror providing another image focal plane of the one or more lenses; a pixelated detector at a first one of said image focal planes; a translation stage that translates parallel to a second one of said image focal planes; and an optical fiber mounted on the translation stage so that an entrance face of the optical fiber is translatable in the second one of said image focal planes.

Also disclosed is an optical device comprising: one or more lenses providing a first image focal plane; a mirror providing a second image focal plane of the one or more lenses; a pixelated detector at the first image focal plane; a translation stage upon which the mirror is mounted; and an optical fiber fixed relative to an optical axis of the one or more lenses so that an entrance face of the optical fiber is in the second image focal plane; wherein the translation stage translates the mirror between a position in which it provides the second image focal plane and a position in which it does not provide the second image focal plane.

Further disclosed is a method for calibrating an optical device that comprises: one or more lenses providing an image focal plane; a mirror providing another image focal plane of the one or more lenses; a pixelated detector at a first one of said image focal planes; a translation stage that translates parallel to a second one of said image focal planes; and an optical fiber mounted on the translation stage so that an entrance face of the optical fiber is translatable in the second one of said image focal planes; the method comprising: focusing the pixelated detector onto a white screen; translating the entrance face of the optical fiber to a desired location; back-illuminating the optical fiber to illuminate a spot on the white screen; applying a mark to the white screen at the illuminated spot; translating the entrance face of the optical fiber outside of a field of view of the pixelated detector; acquiring an image of the white screen and mark; defining pixels of the pixelated detector that correspond to the mark; recording the defined pixels in association with the desired location.

This summary provides a simplified, non-exhaustive introduction to some aspects of the invention, without delineating the scope of the invention.

DETAILED DESCRIPTION OF THE INVENTION

A. Glossary

ADU/s—analog to digital units per second

Figure 1:
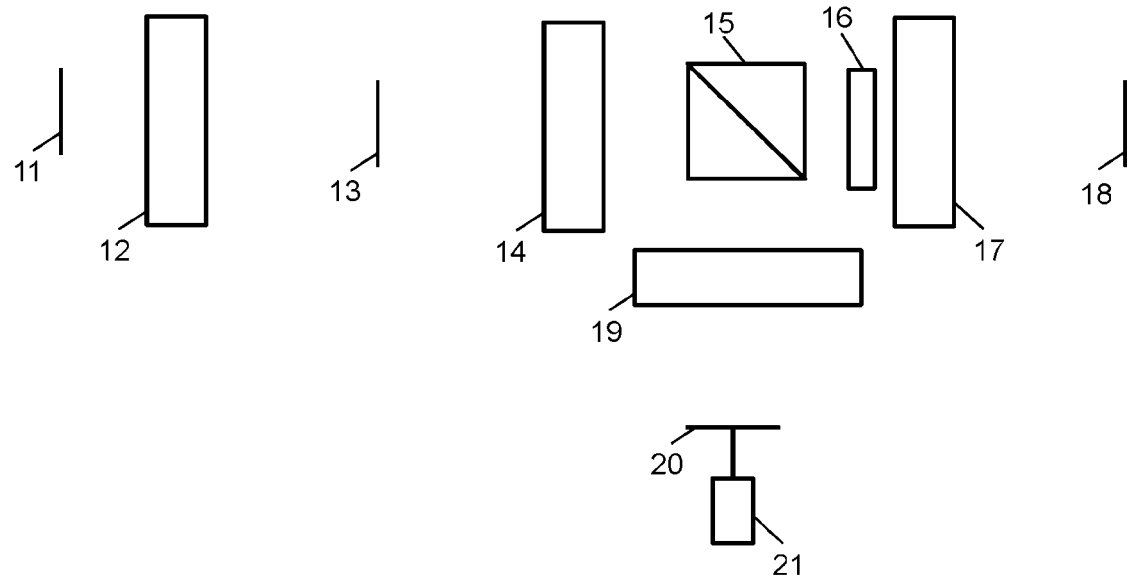
FIG. 1 is a prior art diagram of an imaging colorimeter with integrated spectrometer.

Back-focus—refers to the distance between the camera lens mount and the sensor plane.

CCD—charge-coupled device

Compound lens—a series of simple lenses of different shapes and different refractive indices, arranged adjacent or one after the other on a common axis.

Fiber guide—a thin fiber with a core through which light can pass with very little loss of intensity. The core can be made of glass, plastic or transparent fluid.

Fiber guide assembly—this can be one fiber or a multitude of fibers. It may also include optics in front of the fibers to improve the light collection characteristics including Fresnel, circular or cylindrical lenses. It may also include diffractive optical elements (DOEs).

Fiber Optic—A fiber guide assembly

Filter—an optical device through which some light passes and through which some light is blocked. Types of filters include, but are not limited to, bandpass, polarizing, short-pass, long-pass or neutral density filters. A filter may also be an electronically tunable color filter (e.g., Sharp et al. 1990. "Continuously Tunable Smectic A* Liquid-Crystal Color Filter," Optics Letters 15(10): 523-525). It may also be a Linear Variable Bandpass Filter (LVBF), in which the center wavelength of the pass band varies with position along the length of the filter by, for example, up to a spectral octave.

LED—light emitting diode

LVBF—linear variable bandpass filter

Lit region—the volume comprising all rays of light from a scene passing through a lens and imaged onto a camera sensor.

Measurement surface—the reader should understand that the image of the measurement system includes whatever is in the 3-dimensional volume, or field of view of the instrument, and that by extension, all references to measurement surface, can reasonably be understood to be readily extendable to measurement field of view.

Optical spectrometer—this term includes any electro-optical instrument that measures the relative or absolute optical power of the radiation incident upon the instrument's input optics as a function of wavelength.

Pixelated detector—a two-dimensional array of sensors that is used to capture an image of a scene.

Reference light source—this may be a laser, LED, tungsten lamp, stimulated phosphor lamp, HgAr, or any other light source. The reference light source may be used to check the transmission of light through to the measurement instrument, or it may be used to check the wavelength scale of a spectrometer.

RGB—Red, green, blue

Simple lens—a single lens of a single material, such as a convex lens. Other simple lenses may be concave, plano-convex, plano-concave or meniscus lenses.

Spectrograph—a spectrometer that can simultaneously measure a multitude of spectra on one array detector.

Spectrometer—see Optical Spectrometer.

Spectroradiometer—a spectrometer (optical spectrometer) that has been calibrated in terms of radiometric units, i.e. calibrated to measure the spectral power distribution of electromagnetic radiation incident upon the instrument's input optics.

Spot photometer—an image forming photometer that measures the light for a single area in a scene. The area measured is usually a circle or rectangle.

Turning mirror—this may be a reflecting surface or beam splitting optic.

$\lambda$ is used for denoting a specific wavelength in a continuous or a nearly continuous spectrum.

$\Delta\lambda$ is used for denoting the central wavelength of a wide spectral band within a larger spectrum.

B. Exemplary Embodiments

Figure 4:
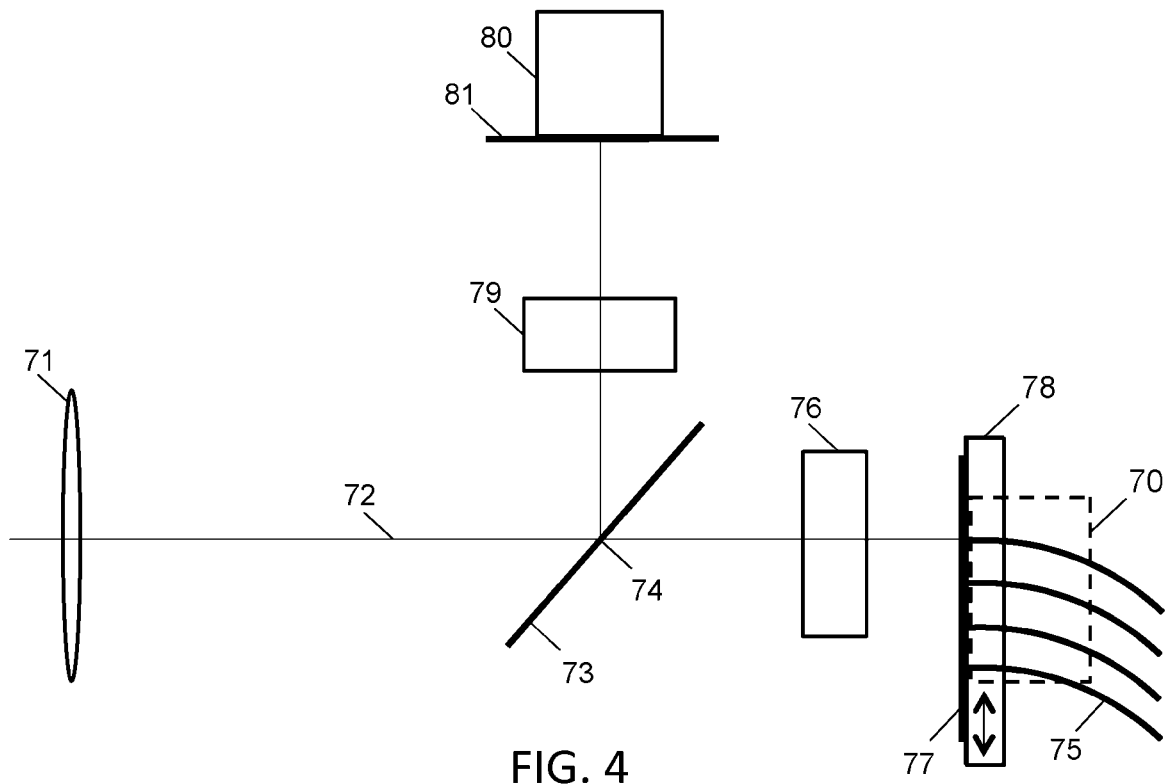
FIG. 4 shows an arrangement with a mirror and fiber-translating stage, according to an embodiment of the present invention.

FIG. 4 shows an exemplary embodiment with a translatable fiber assembly 70 with optical fibers 75. The imaging system has objective lens 71, optical axis 72 and mirror 73 with a transparent aperture at center 74 of the mirror. The lens 71 focuses the light onto the mirror 73 at center 74 and in a plane perpendicular to the optic axis. The mirror 73 therefore intersects a focal plane of the lens 71. The mirror may have a plurality of transparent apertures that may be positioned at 74 via rotation or translation of the mirror. The fiber guide assembly with its input surface at focal plane 77 of the objective lens samples the light which passes through aperture 74 and focusing lens 76. The fiber guide assembly 70 may be translated in the focal plane 77 by translation stage 78, in one or two dimensions. Light reflected off the mirror 73 is focused by lens 79 onto an eyepiece or to a pixelated detector 80, the detection surface of which is located in another focal plane 81 of the objective lens, provided by the mirror. The location and translation properties of the fiber sampling areas are mapped to pixel locations in the pixelated detector.

Figure 5:
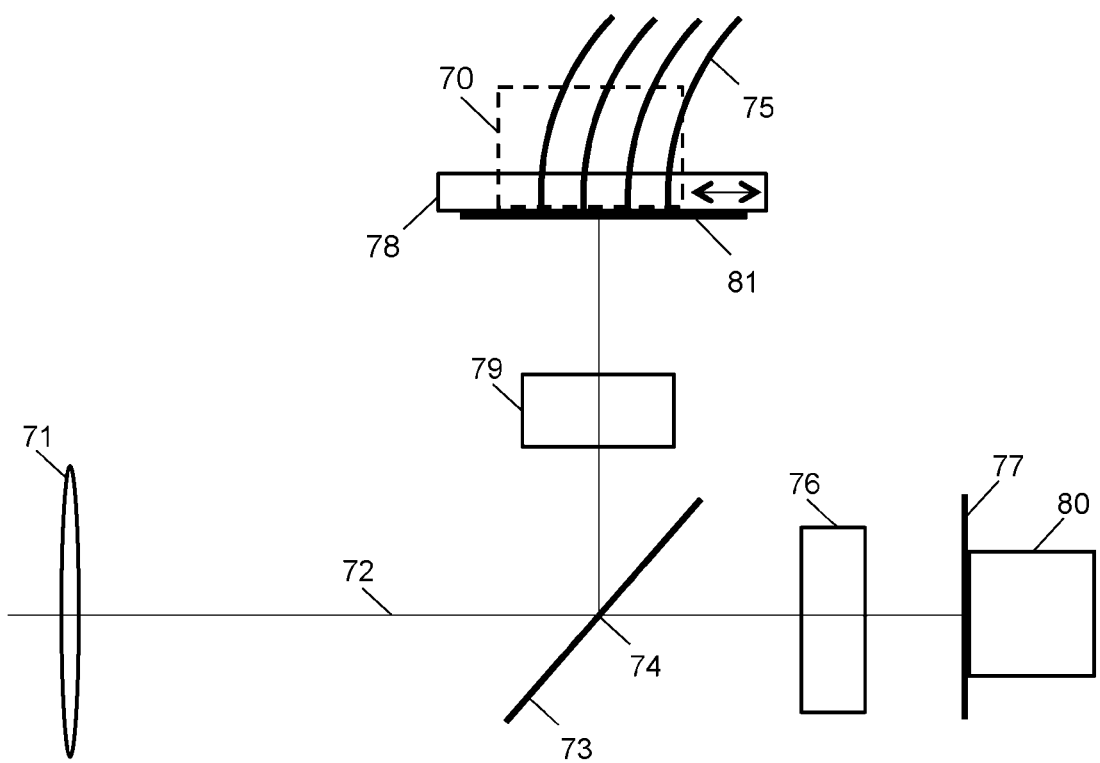
FIG. 5 shows an arrangement with the beam splitter and fiber-translating stage switched, according to another embodiment of the present invention.

The turning mirror in the invention is readily realized using a front surface mirror or other mirror. For example, a thin transparent mirror or an optical pellicle may be used. Other reflecting components may be substituted for the beam splitter. If the surface of the mirror 73 had a mirrored spot at 74 and was transparent elsewhere, then the positions of the translation stage 78 with fiber guide assembly 70 and pixelated detector 80 could be swapped, as in FIG. 5.

Figure 6:
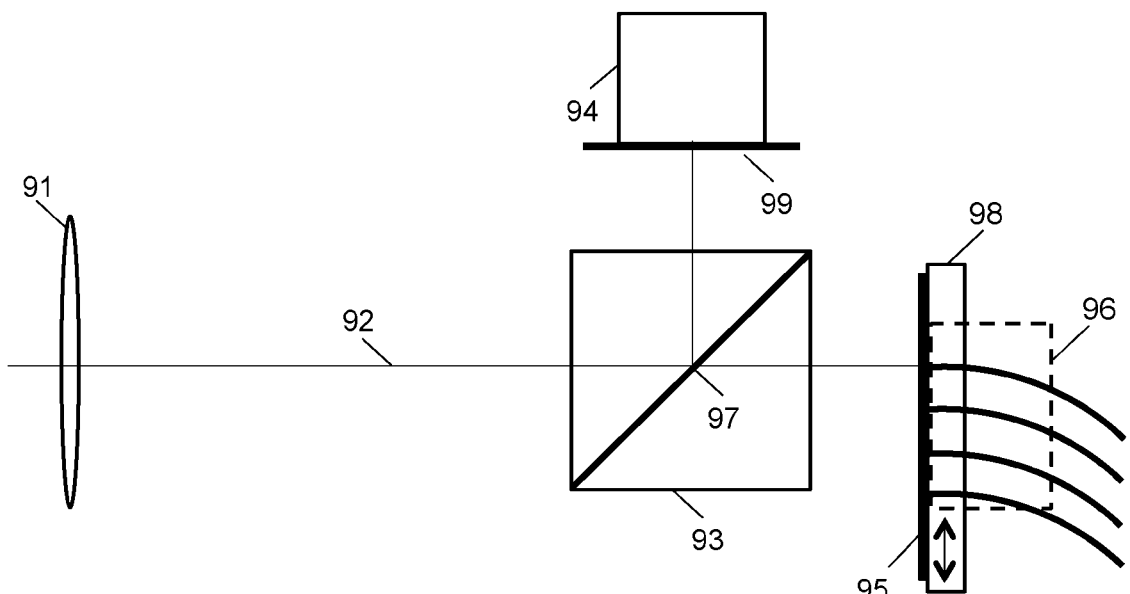
FIG. 6 shows an arrangement with the beam splitter and fiber-translating stage, according to another embodiment of the present invention.

FIG. 6 depicts an imaging system with a focusing lens or focusing lens assembly 91 (or imaging lens), which, by means of an optical beam splitter 93, simultaneously focuses light onto two focal planes—at focal plane 95 at the optical fiber assembly 96 and at focal plane 99 at the pixelated detector 94. The focusing lens may be a simple lens or a compound lens. The entrance surface of optical fiber assembly 96 may be moved in the focal plane 95 by the translation stage 98. For illustration purposes, the optical axis 92 and its intersection with the beam splitting surface at 97 is depicted. Note that in the system of FIG. 6, there is no intervening lens between the beam splitting mirror and the focal planes at 95 and 99. This embodiment does not have the focusing lenses 76, 79 that are present in the embodiments of FIGS. 4 and 5. In another embodiment, relay lenses similar to 14, 17 and 19 in FIG. 1 are added. However, in this embodiment with relay lenses the size of the beam splitter would be several times greater in volume and the cost of it, the relay lenses and the system alignment may be high. The position of the pixelated detector 94 may be swapped with the optical fiber assembly 96 and translation stage 98.

Figure 7:
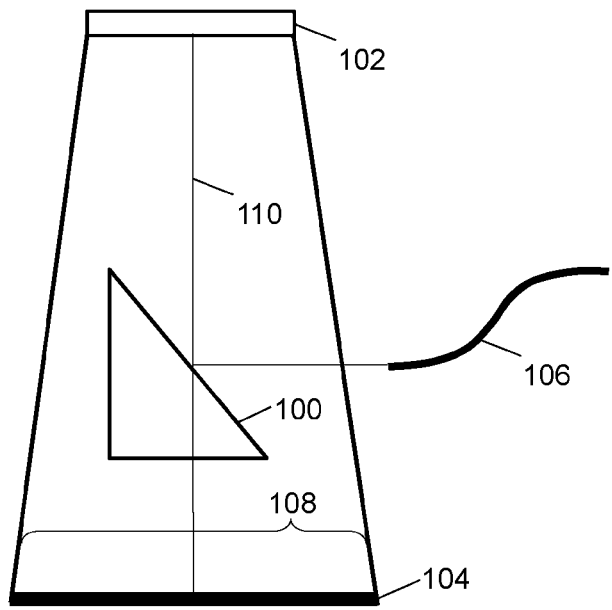
FIG. 7 shows an assembly of a turning mirror and optical fiber, according to an embodiment of the present invention.
Figure 8:
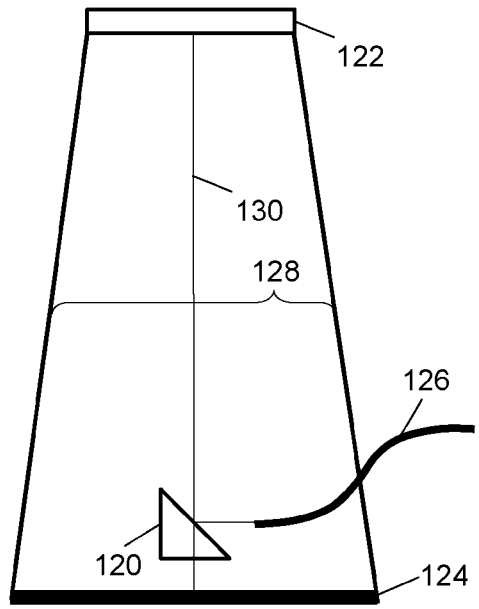
FIG. 8 shows an assembly of a turning mirror and optic fiber, according to another embodiment of the present invention.
Figure 9:
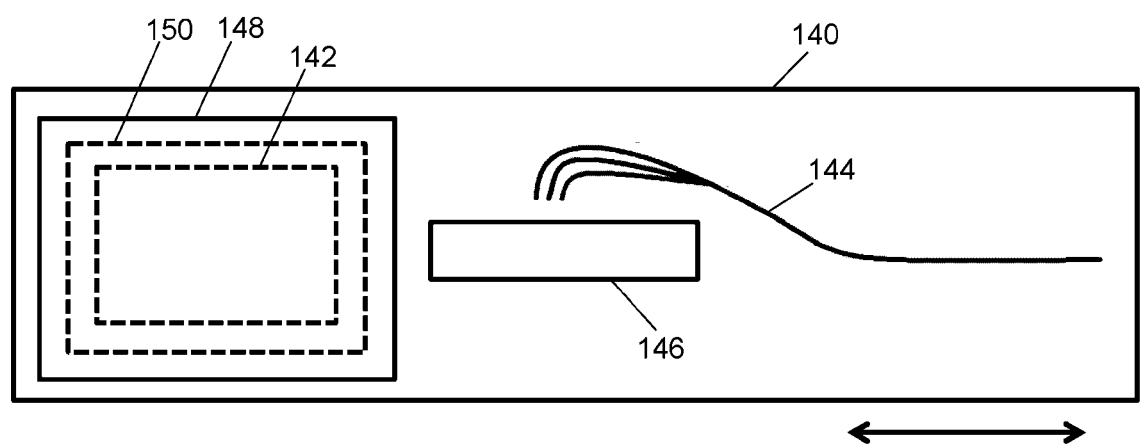
FIG. 9 shows a translation stage, according to an embodiment of the present invention.

In some embodiments, the imaging system includes a translating stage on which is mounted both a mirror and fiber(s). The stage moves in the plane perpendicular to the optical axis, in one or two dimensions. FIGS. 7-9 show such arrangements. The translation is such that the entrance face to each fiber in the fiber assembly is positioned in a focal plane of the imaging lens at one or a multitude of locations in the lens field of view. It is convenient to have the mirror and fiber assembly translate on a single stage, however, it is also possible to have the mirror and fiber assembly translate separately on two stages. It is also possible that both the stages be translated in more than one dimension.

FIG. 7 depicts a turning mirror 100 between a field stop or exit pupil 102 of a lens and a pixelated detector array 104. The turning mirror 100 deflects the light so that it is in focus at the entrance plane of a fiber optic assembly 106. In order along the optical axis 110 there is the exit pupil 102, the mirror 100 and then the pixelated detector 104. The fiber optic assembly 106 is located outside the possible light cone 108 of the imaging system.

FIG. 8 depicts a turning mirror 120, between a field stop or exit pupil 122 of a lens, and a pixelated detector array 124. The turning mirror 120 deflects the light so that it is in focus at the entrance plane of a fiber optic assembly 126. In order along the optical axis 130 there is the exit pupil 122, the mirror 120 and then the pixelated detector 124. The fiber optic assembly 126 is positioned at least partially within the imaging light cone 128. Note that if the fiber optic assembly were not translated with the mirror 120 out of the field of view, the fiber optic assembly would occlude light to the image sensor 124. FIG. 8 shows a more compact assembly of turning mirror and fiber guide compared to FIG. 7, however, the fiber occludes the camera sensor, depending on where the translation stage is set.

Figure 2:
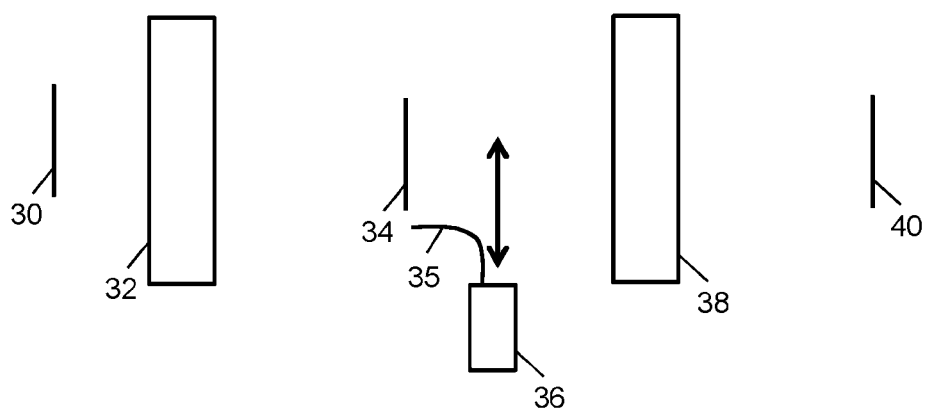
FIG. 2 is a prior art instrument with a moving spectrometer.
Figure 3:
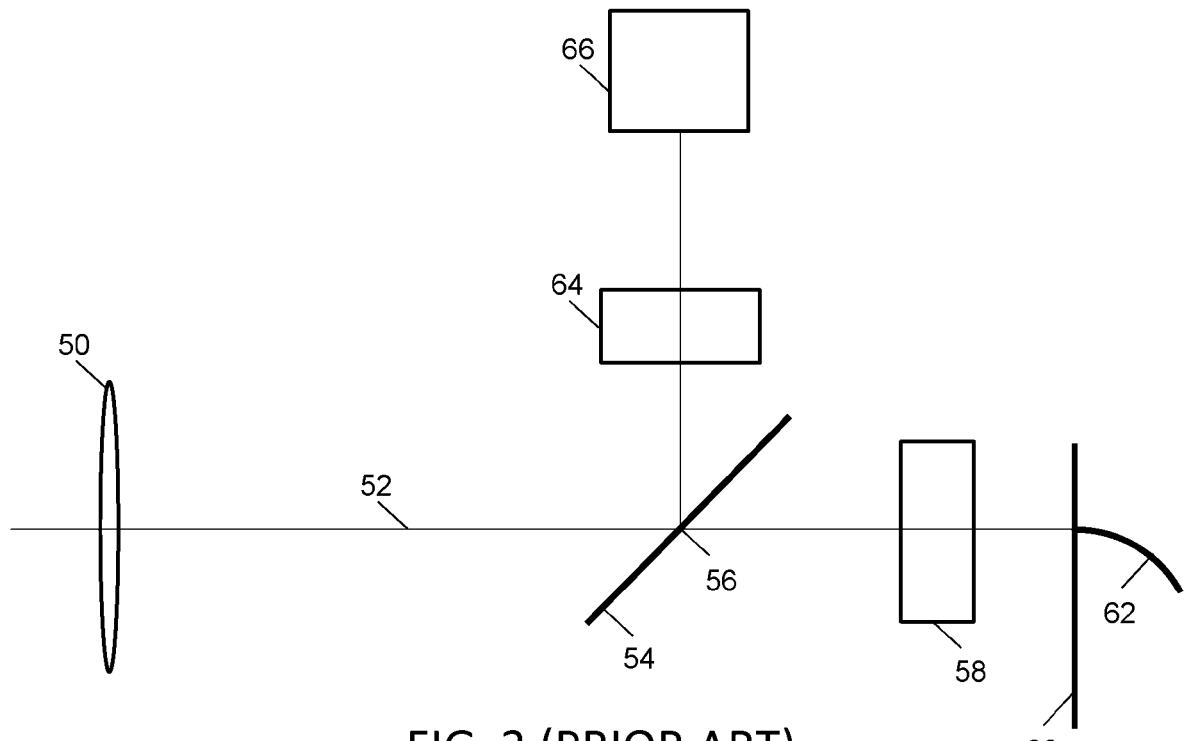
FIG. 3 shows a prior art imaging system.

Note that in the systems of FIGS. 7 and 8, there is no lens between the mirror and the pixelated detector 104, 124, and no intermediate focal plane. This is in contrast with prior art systems that have intermediate focal planes 13 (FIG. 1), 34 (FIG. 2), which is an intermediate Fourier focal plane, and at the plane with center point 56 (FIG. 3). The mirror 100, 120 is between the exit pupil 102, 122 and the pixelated detector 104, 124, without any other intervening lenses on the optic axis. Other intervening optical components, such as filters, may be present in other embodiments, however.

The fiber optic assembly 106, 126 may be translated to a multitude of positions and collect light from a corresponding multitude of locations in the scene that is imaged. There may be just one fiber or a multitude of fibers in the assembly, for example in a linear array or a 2D array. The fibers may be coupled to one or more spectrometers or other light measurement instruments.

FIG. 9 depicts a moveable, linear translation stage 140 in front of a pixelated detector 142. The translation stage is assembled with a fiber guide assembly 144, a turning mirror 146, and an additional optical filter 148 mounted over an aperture 150 in the translation stage. In this perspective, the axis of illumination from the lens is normal to the page, and the turning mirror 146 reflects the light upwards onto the fiber assembly 144. By translation of the stage 140 any component on the stage including the mirror 146 or the filter 148 may be inserted into the light path between the lens and pixelated detector 142. The stage may be longer to accommodate a multitude of filters or other optical components. The filter 148 and aperture 150 are depicted as being larger than the area of the pixelated detector 142 so that when the filter is in the beam path, the entire pixelated detector area is imaged with filtered light. There need not be any filter 148 in some embodiments, while in others, there could be a multiple of locations along the stage 140 for mounting filters for the image sensor similar to the features 150, 148 and 142. The moving mirror 146 need not be as tall or as wide as the sensor area (i.e. area of pixelated detector 142). For example, the mirror size may be limited to be only large enough to accommodate the angles of light that are collected by the fiber(s) from the lens. The closer the mirror is to the pixelated detector, the smaller the turning mirror can be.

If the angles of illumination to the edges of the focal plane are higher than can be accepted by the fiber assembly 144 then there may be additional strategies deployed to improve fiber collection efficiency including light shaping optics in front of the fiber assembly. For example, a curved turning mirror may be used instead of planar turning mirror 146, or a turning mirror with multiple planar segments which are at different orientations may be used instead.

FIG. 9 also shows that the stage 140 is much wider than area of the pixelated detector 142. If the section of the stage where the mirror 146 is mounted does not transmit any light, then no light will reach the pixelated detector when the mirror section is in front of the pixelated detector. This shuttering from light allows automated dark measurements of the pixelated detector. In other embodiments the stage 140 may be widened in the mirror section relative to other sections of the stage to accomplish the desired shuttering.

Figure 10:
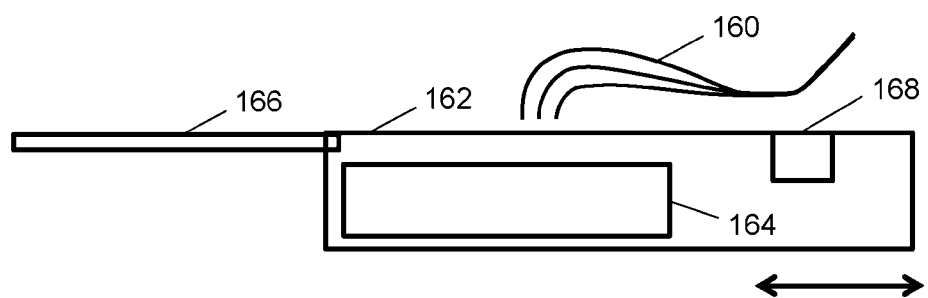
FIG. 10 shows another translation stage, according to an embodiment of the present invention.

FIG. 10 depicts a modification of the arrangement in FIG. 9. In this embodiment of the invention the fiber optic assembly 160 is stationary relative to the translating stage 162. The turning mirror 164 diverts light such that the image is in focus at the plane of the tips of the fiber(s) in the assembly 160, i.e. the entrance faces of the fibers. In some positions of the stage, a baffle such as 166 is connected to the stage that blocks light from entering the fibers of the fiber optic assembly 160 when the mirror 164 is not in the optical path. When the baffle 166 is in position in front of the fiber, the dark signal or noise of the spectrometer may be measured.

Also shown in FIG. 10 is a configuration of the instrument wherein the translation stage is utilized to present a reference light source to the fiber optic assembly. The reference light source may be used to check the transmission of light through to the measurement instrument, or it may be used to check the wavelength scale of the spectrometer. There are ways that the translation stage could be used to illuminate the fiber while also automatically blocking light from the lens to the fiber. For example, if the fiber assembly is fixed and not mounted on the translation stage, the stage could have mounted on it a small lamp 168 or light source that illuminates the fiber optic assembly when the lamp 168 and fiber optic assembly 160 are aligned via stage translation.

In another example, if the fiber and turning mirror are translating with the stage, then at some position when the mirror is not in the light path between the lens and pixelated sensor, a fixed position light source may illuminate the fiber via the turning mirror. Other possibilities to achieve illumination of the fiber with a reference lamp via translation of the stage may be devised using a multitude of methods and are not limited to the methods above.

Figure 11:
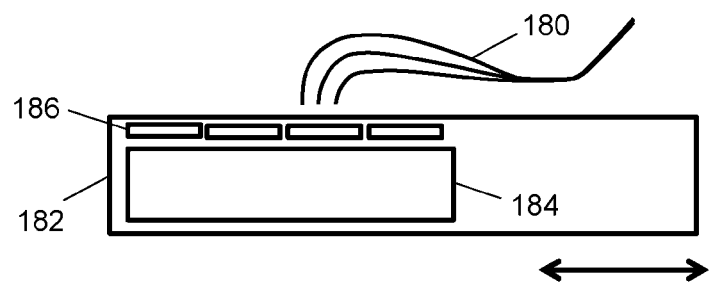
FIG. 11 shows another translation stage, according to an embodiment of the present invention.

FIG. 11 depicts a modification of the arrangement in FIG. 10. In this embodiment of the invention the fiber optic assembly 180 is stationary relative to the stage 182. The turning mirror 184 diverts light such that it passes through one or more filters 186 before the light is focused on the fiber(s) in the assembly 180.

Figure 12:
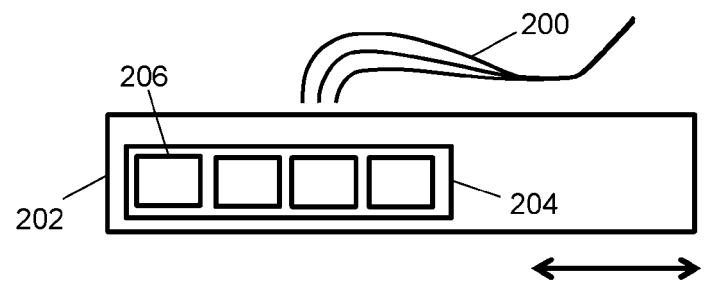
FIG. 12 shows another translation stage, according to an embodiment of the present invention.

FIG. 12 depicts another modification of the arrangement in FIG. 10. In this embodiment of the invention the fiber optic assembly 200 is stationary relative to the stage 202. The turning mirror 204 has filters 206 mounted or deposited directly on the turning mirror. Light focused at the entrance plane of the tips of the fiber(s) in the assembly 200 is filtered by the filter(s) 206.

The filters in FIGS. 11 and 12 may be of any kind to create the desired effect. Types of filters include, but are not limited to, bandpass, polarizing, short-pass, long-pass or neutral density filters. The turning mirror may be a reflecting surface or beam splitting optic.

In embodiments where they are present, the multiple turning mirror elements may also be at different distances such that different object locations are imaged onto the fiber with one or more different turning mirror elements.

Through translation of the fiber and mirror, one location in the scene may be sampled by a multitude of fiber-based instruments. For example, two spectrometers at different wavelength ranges and a flicker sensor are all connected by the fiber assembly and may, via translation of the stage, sample the same location sequentially. Software may stitch the two spectra together to provide a wider spectrum. It can be readily imagined that there may be a multitude of fiber-based instruments that could be combined to increase the measurements at one particular location. Additionally, users skilled in the art will recognize that lenses are generally not in focus for all wavelengths. If different fibers are used to collect light over different wavelength ranges, then the fibers may be oriented at various distances from the exit pupil to optimize in-focus imaging for each wavelength range and fiber combination.

Figure 13:
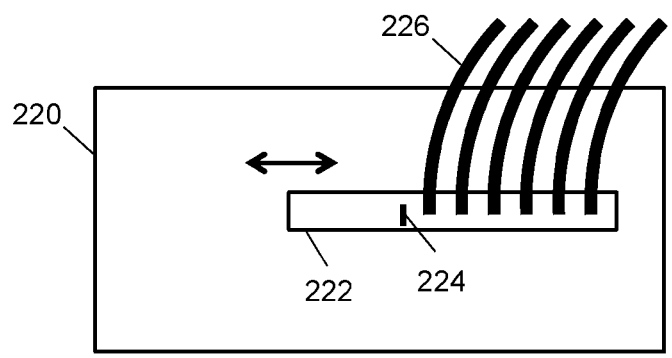
FIG. 13 is a translating stage for input to a spectrometer, according to an embodiment of the present invention.

In another embodiment, there are a multitude of fibers in the fiber guide assemblies of FIGS. 7 and 8 that are imaged by the mirror. Light enters the fiber(s) near the mirror and exits the fiber(s) at one or more measurement instruments remote from the mirror. For example, the fibers may terminate on another translation stage at the input to an optical measurement instrument. FIG. 13 shows a spectrometer and translating stage assembly configured to accept a plurality of fiber inputs. The spectrometer 220 has a translating stage 222 that can translate in front of the spectrometer's entrance slit 224, such that no fibers, one fiber or a limited number of fibers 226 illuminate the slit depending on the position of the translating stage.

The fibers need not be positioned very near to the entrance slit if there is a lens in front of the entrance slit that focuses the fiber's light onto the entrance slit. In another embodiment, not shown, each fiber has a miniature lens (micro lens) coupled to it and the fiber and the mated miniature lens translate together.

Figure 14:
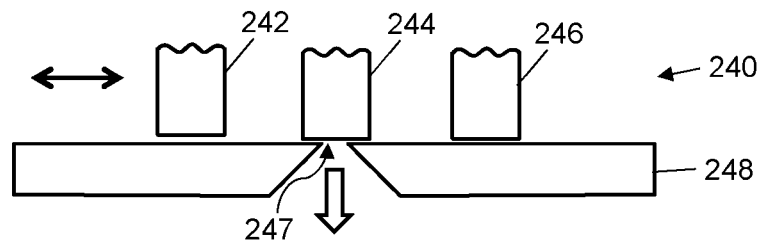
FIG. 14 shows a profile of how the fiber ends are translated so that only one fiber at a time is positioned to illuminate the spectrometer entrance slit, according to an embodiment of the present invention.

FIG. 14 shows a profile of how the fiber ends are translated so that only one fiber at a time is positioned to illuminate a limiting aperture. The fibers may be arranged in a 1×N array 240, of 1 row and N columns, for example. This array of fibers 242, 244, 246 is positioned very close to the entrance slit 247 of a spectrometer 248 such that only one fiber in a linear array, or one or more rows of fibers in a 2D array, illuminate the entrance slit. The array of fiber ends is mounted on a translatable stage. The stage may be translated so that a plurality of fibers are positioned to pass light into the spectrometer entrance slit, one fiber or one group of fibers at a time. The arrangements of the fibers need not be the same at both ends of the assembly.

In another embodiment, where the spectrometer entrance slit is taller than the fiber diameter, the fibers are arranged in a two-dimensional, M×N array, of M rows and N columns such that the stage can be arranged to present M fibers of a column to a spectrometer entrance slit. In this way the light from M fibers can be measured simultaneously. The stage can then be stepped so that another column of M fibers illuminates the spectrometer entrance slit and can be measured.

In other embodiments, instead of, or in addition to a spectrometer entrance slit, there is some other limiting aperture that permits the light from only one or a limited number of fibers in the array to illuminate some other light measurement instrument such as a flicker detector.

Figure 15:
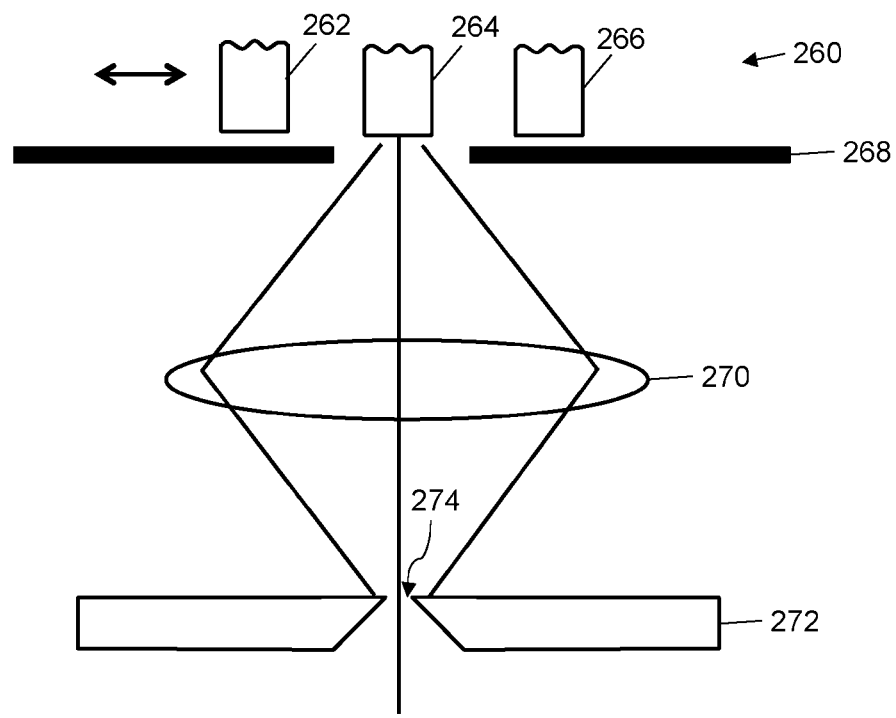
FIG. 15 illustrates an embodiment of the present invention where the fibers translate so that only one fiber or column of fibers illuminates the spectrometer entrance slit at one time.

FIG. 15 illustrates an embodiment where the array 260 of fibers 262, 264, 266 translate so that only one fiber or column of fibers illuminates the spectrometer entrance slit 274 at one time. The lens 270 focuses the light onto the limiting aperture 274. Also shown is an optional baffle 268 to reduce the chance of light from neighboring fibers entering the limiting aperture 274, which may be an entrance slit of the spectrometer 272. In general, the entrance slit 247 and aperture 274 may couple light to other things than a spectrometer input. Examples of other devices that may be coupled include including integrating spheres, fiber assemblies, free-space optics, filters, detectors and lensed optical systems.

The propagation of light through the optical fibers can be in either direction. Also, there can one input and multiple outputs or multiple inputs and one output. It is also possible that there are multiple inputs and multiple outputs via multiple limiting apertures. In one example there are a multitude of optical fibers coming from the device of, for example, any of FIGS. 4-8. Outputs from the optical fibers may be directed to one or more spectrometers or other light measurement instruments.

Figure 16:
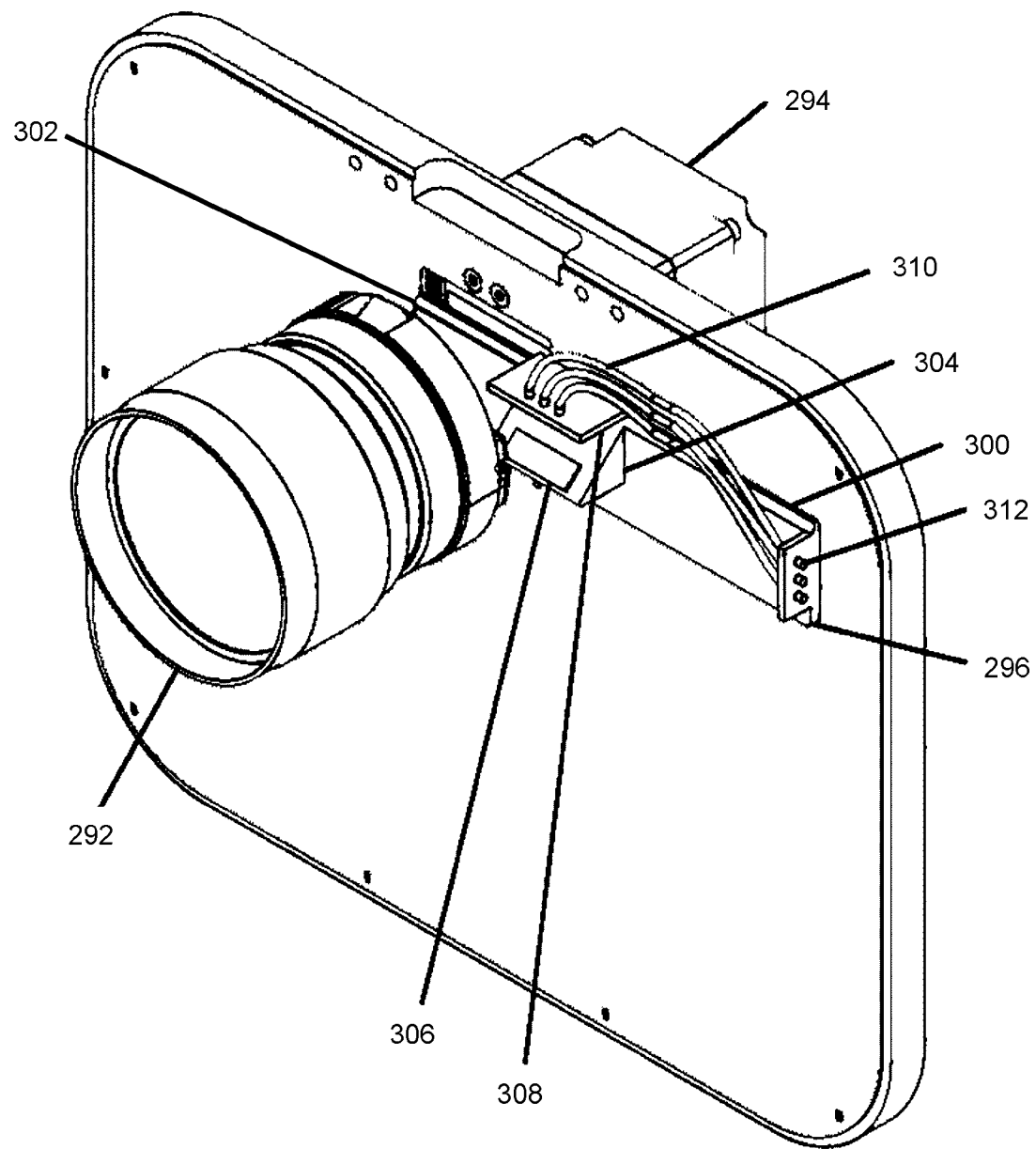
FIG. 16 is an imaging camera equipped with a translating stage for a spot spectrometer, according to an embodiment of the present invention.

FIG. 16 shows an imaging system with camera 294 combined with an assembly 296 for transmitting light onto one or more optical fibers 310, for transmission to one or more spot spectrometers or other optical devices. The camera has a pixelated detector at the focal plane of the lens 292. The spot spectrometer functionality is achieved by an optical fiber, a turning mirror 306 and an optical fiber spectrometer (not shown) that is connected to the remote ends of the optical fibers 310. The assembly 296 includes a translation stage 300 mounted on tracks (not shown) and driven by a lead screw assembly (not shown). In other embodiments, other movement techniques may be employed, for example piezo actuation may be used instead of a lead screw. The translation stage 300 carries an angled mount 304 on which is mounted a filter 302 and the mirror 306. In this example the mirror is at 45° to the optic axis of the lens 292. Above the mirror 306 there is a mounting plate 308, in which the ends of three optical fibers 310 are mounted. The entrance surfaces of the optical fibers are in the image plane of the lens 292 when the translation stage 300 has moved the mirror between the lens 292 and the pixelated detector of camera 294. The optical fibers shown as terminating at 312 in fact continue and can be connected to a variety of different outputs or measurement instruments, such as the spectrometer of FIG. 13.

Figure 17:
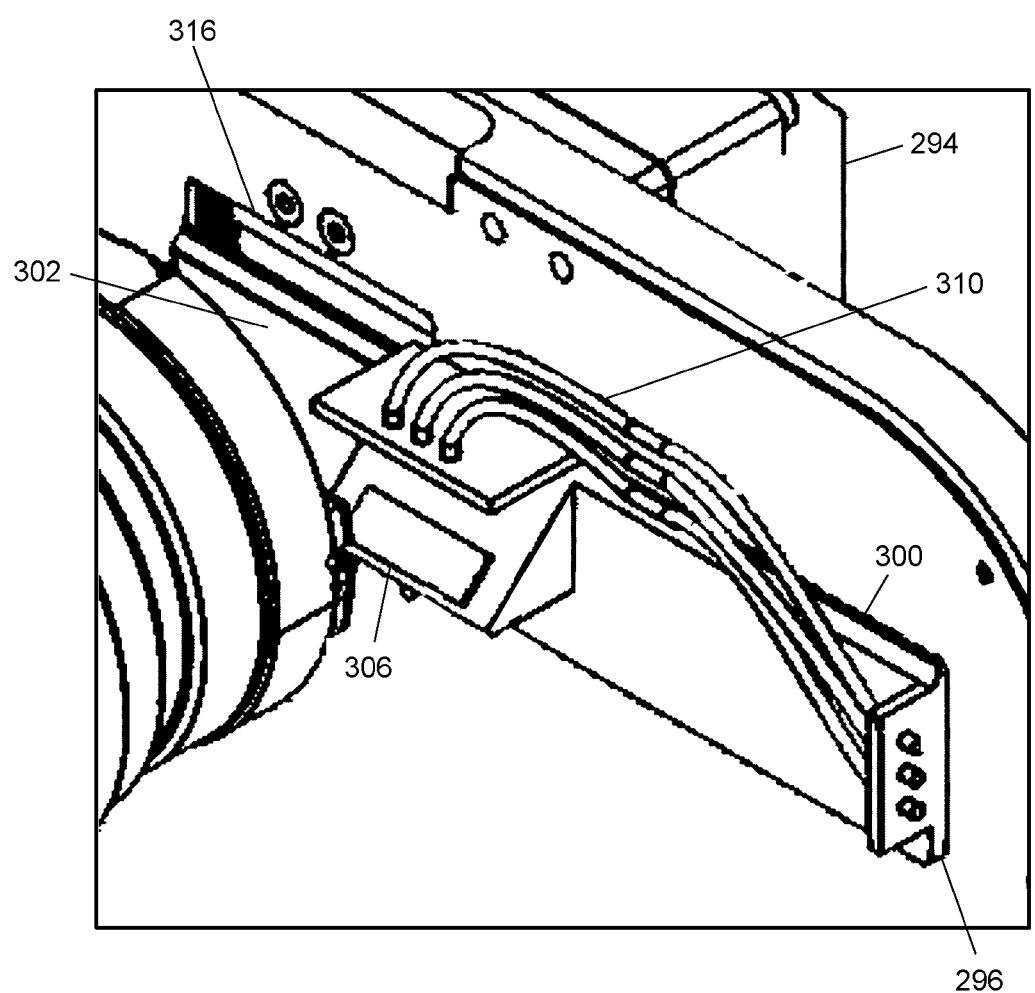
FIG. 17 is a close-up of the translation stage of FIG. 16.

FIG. 17 is a close-up of the assembly 296 in FIG. 16. When the stage 300 is positioned such that the filter 302 is in front of the pixelated detector of camera 294, the mirror 306 and fiber assembly 310 are out of the image path and do not occlude the light to the pixelated detector 316.

Figure 18:
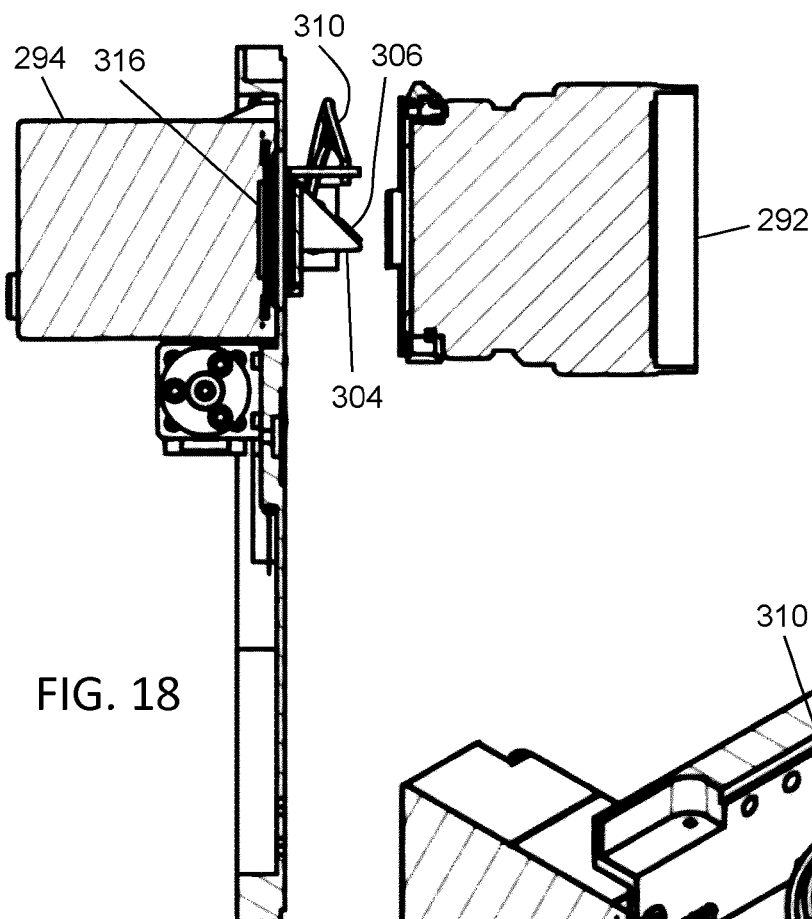
FIG. 18 is a side sectional view of an imaging camera equipped with a translating stage for a spot spectrometer, according to an embodiment of the present invention.

FIG. 18 is a side view of the imaging camera 294 combined with a moving mirror and fiber outputs. The camera has lens 292 and pixelated detector 316. The angled mount 304 on which is mounted a mirror 306 is shown, as are the optical fibers 310.

Figure 19:
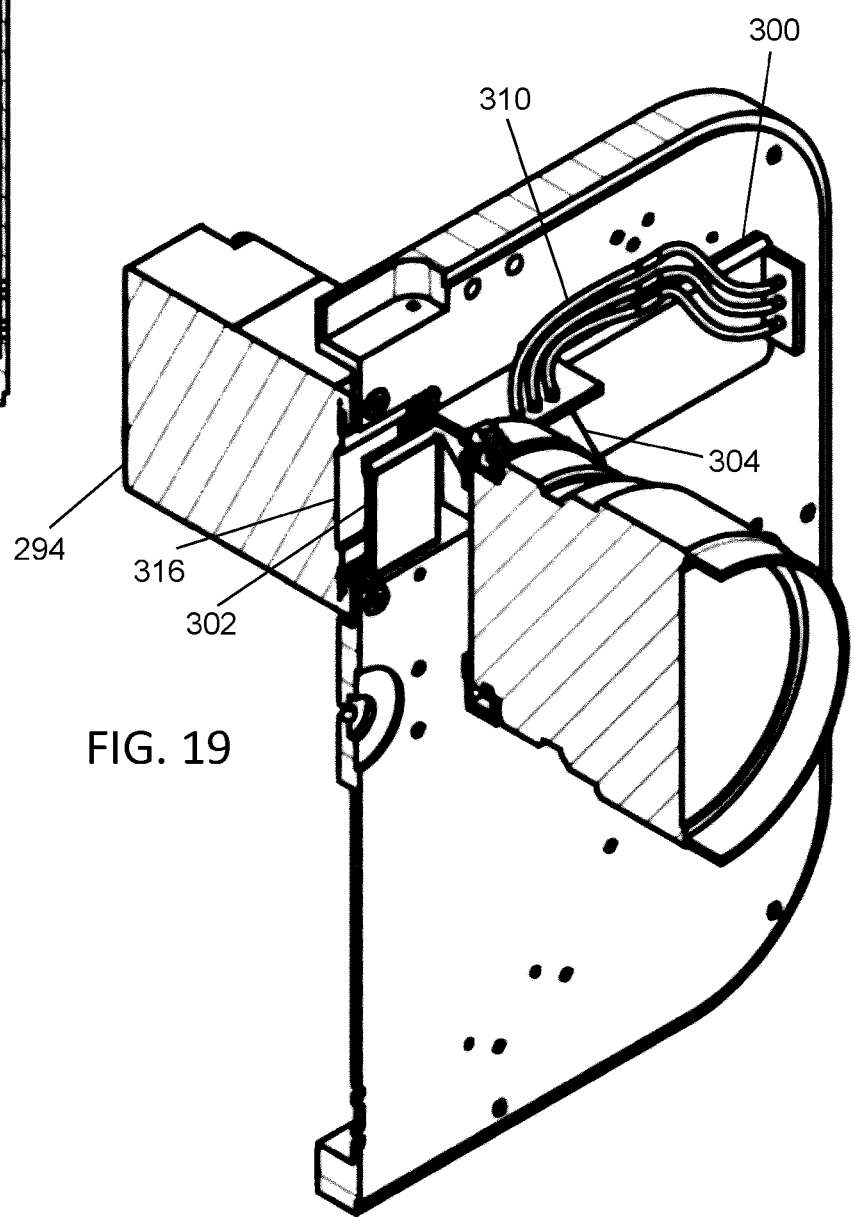
FIG. 19 is a cut-away perspective view of an imaging camera equipped with a translating stage for a spot spectrometer, according to an embodiment of the present invention.

FIG. 19 is a cut-away perspective view of the camera 294 showing the angled mount 304, a filter 302 in front of the pixelated detector 316 and the optic fibers 310 mounted on stage 300.

Figure 20:
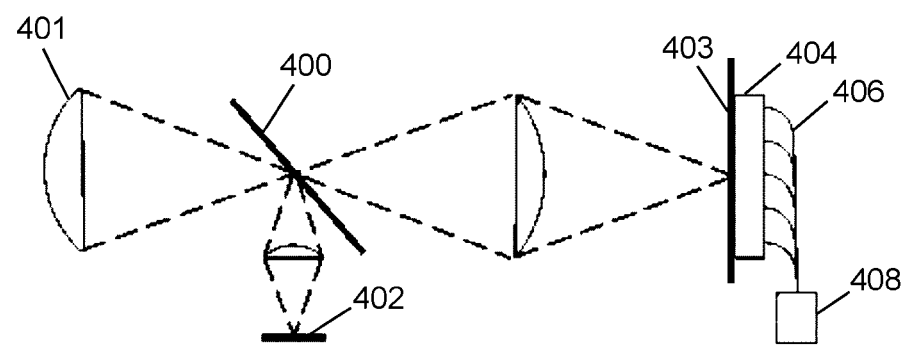
FIG. 20 is a system with a liquid crystal display, according to an embodiment of the present invention.

The invention discloses a mechanical stage supporting one or more optical fibers and optional filters that can be translated in one or two dimensions across the focal plane, but there are other possible approaches. For example, FIG. 20 shows a device in which a mirror 400 and objective lens 401 define two image focal planes 402, 403. A high-contrast liquid-crystal display 404 is optically bonded to a linear or 2D optical fiber array 406 connected to spectrometer 408. The liquid crystal display may be operated, for example, in single-pixel mode to select individual fibers, or it may be operated as a Hadamard transform mask (e.g., Sloane, N. J. A., et al. 1976. "Masks for Hadamard Transform Optics," Applied Optics 15(1): 107-114) for greater signal throughput. Alternatively, a Digital Micromirror Device (DMD) such as manufactured by Texas Instruments (Dudley, D, et al. 2003. "Emerging Digital Micromirror (DMD) Applications," Proc. SPIE Vol. 4985, MOEMS Display and Imaging Systems) may be used instead of the LCD.

Figure 21:
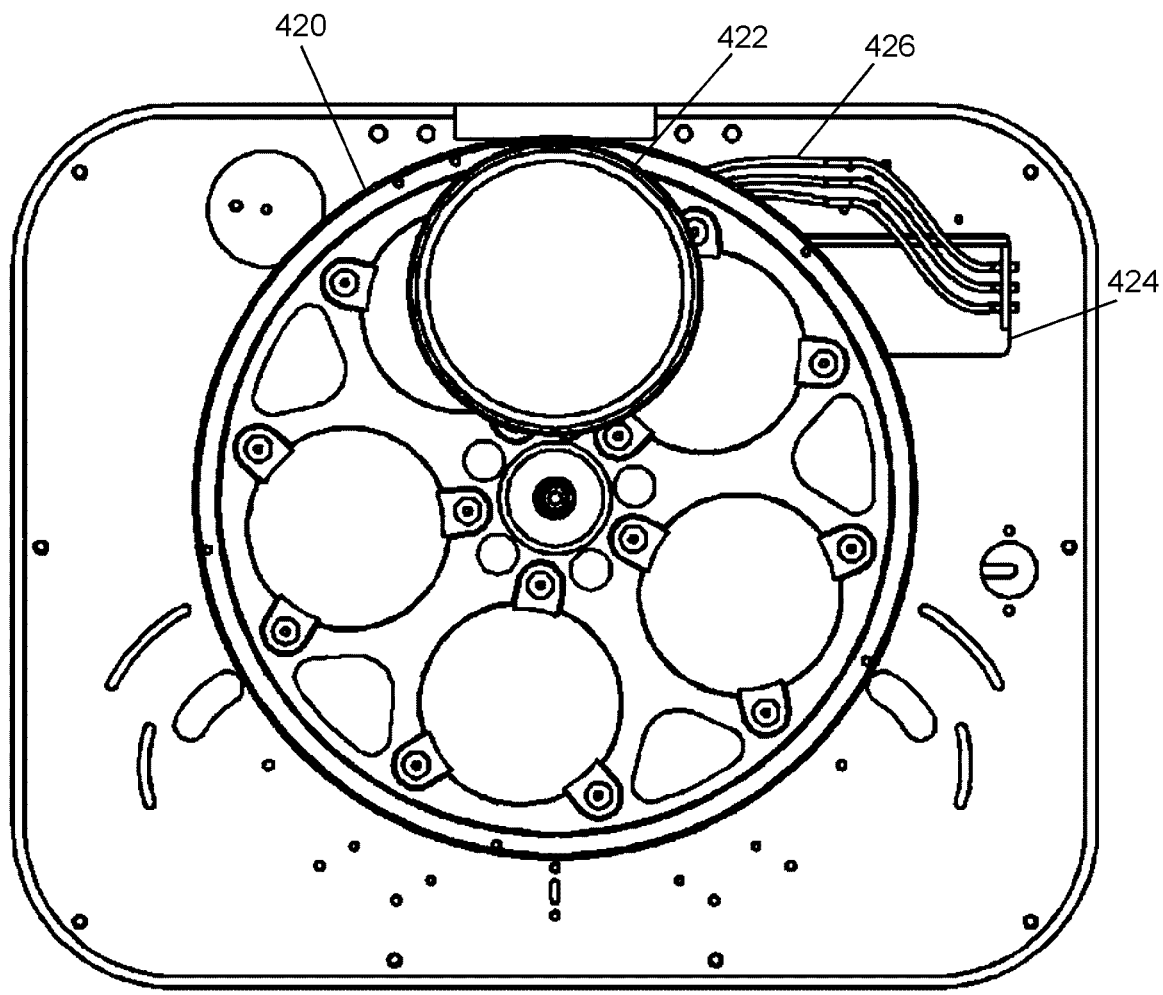
FIG. 21 shows a front view of the inclusion of a filter wheel in front of the translation stage, according to an embodiment of the present invention.
Figure 22:
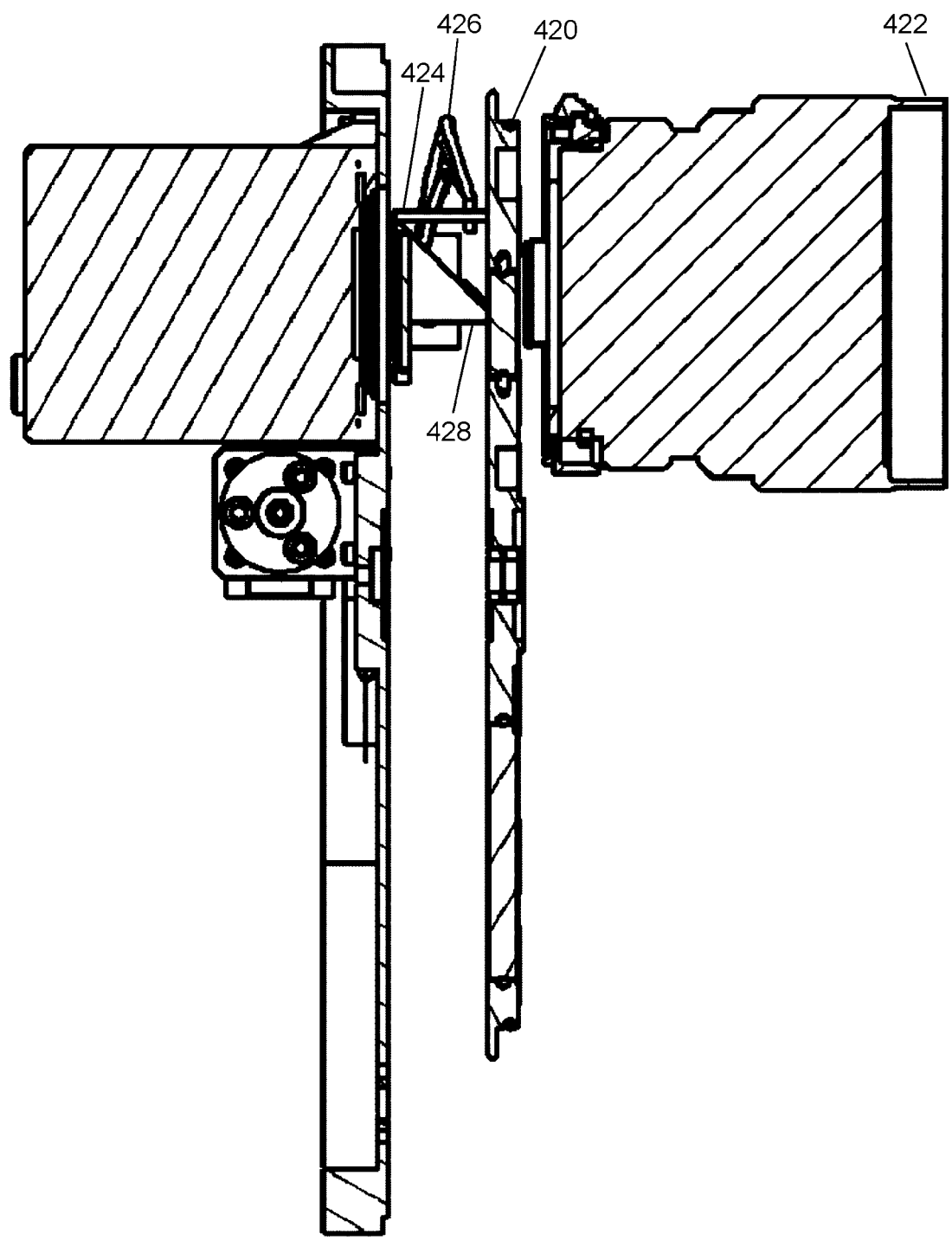
FIG. 22 shows a side sectional view of the inclusion of a filter wheel in front of the translation stage.
Figure 23:
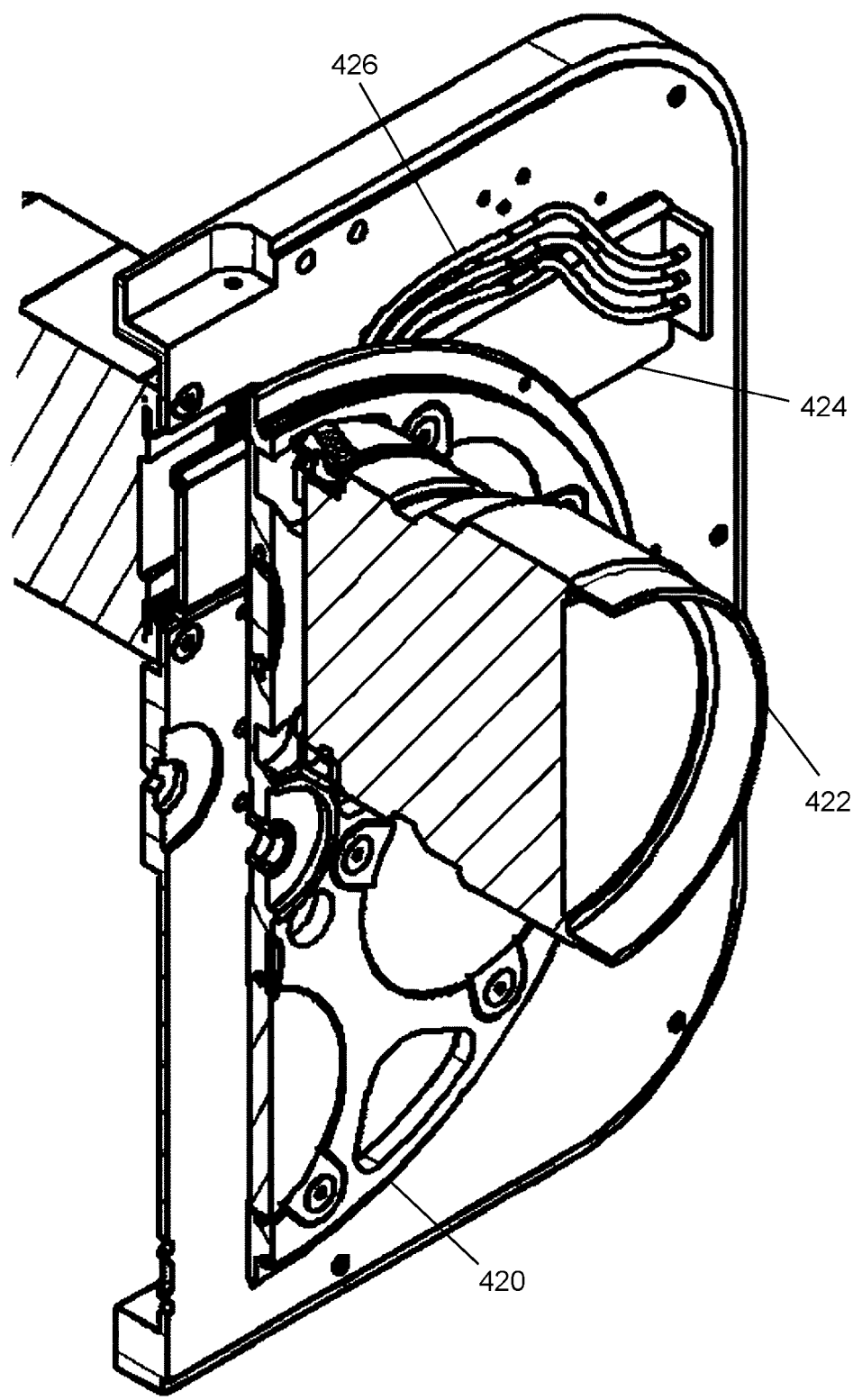
FIG. 23 shows a cut-away perspective view of the inclusion of a filter wheel in front of the translation stage.

FIGS. 21-23 show an imager and spot sampler device with the inclusion of a filter wheel 420 behind the lens 422 and in front of the translation stage 424. Optical fibers 426 are visible mounted on the translation stage. In FIG. 22, the prism mirror 428 is visible.

C. Calibration of Fiber Location

Figure 24:
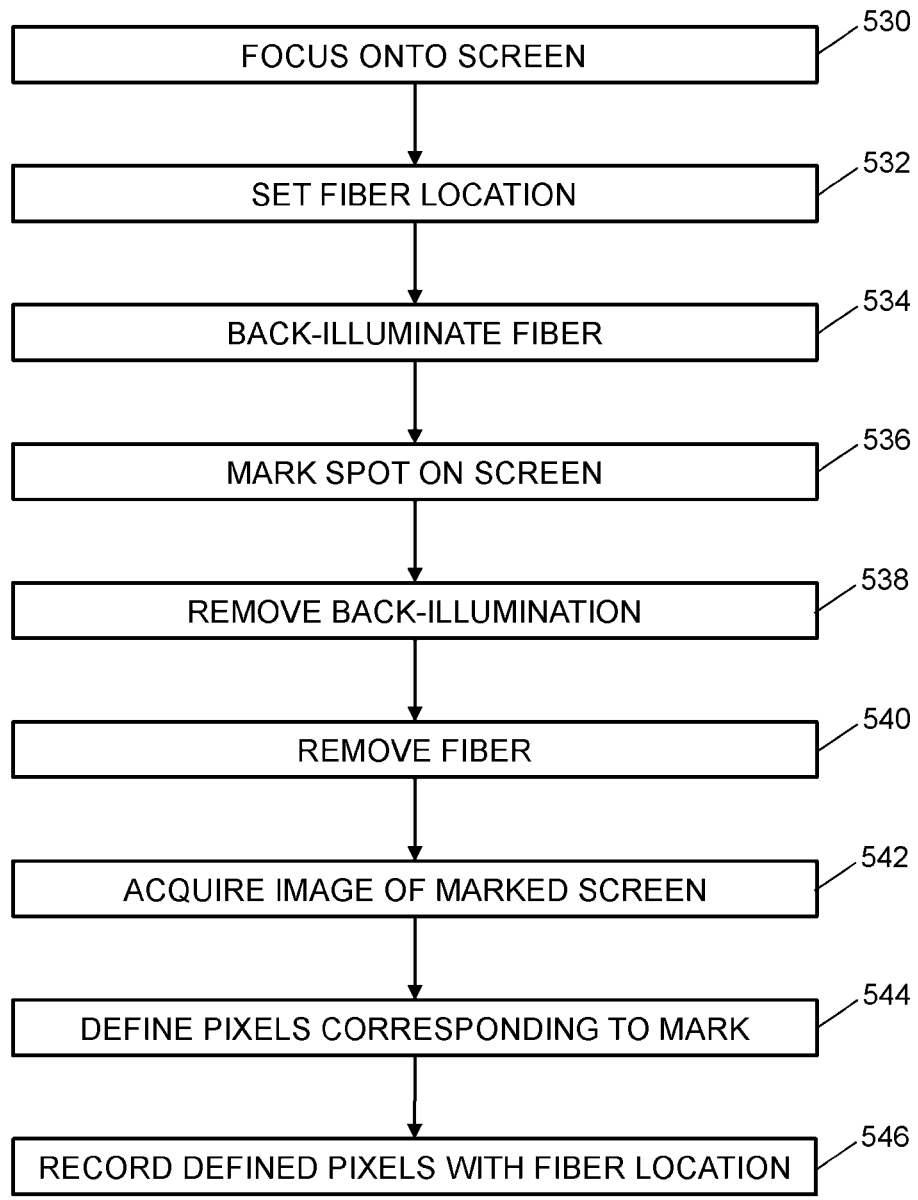
FIG. 24 is a flowchart for calibrating the fiber location with the pixels of the imaging detector, according to an embodiment of the present invention.

The location and translation properties of the fiber sampling areas are mapped to pixel locations in the pixelated detector. One way to establish the location of a fiber is shown in FIG. 24. In step 530, the pixelated detector and lens are used to focus onto a white screen. In step 532, the optical fiber assembly is translated to a desired fiber location or fiber locations behind the lens assembly. In step 534, the fiber(s) are back-illuminated with a bright light, i.e. bright enough to transmit backwards through the optical system and project in-focus spots on the white screen corresponding to the sampling areas of the fiber(s) in the fiber assembly. In step 536, the locations of the fiber spot(s) are marked directly on the screen.

In step 538, the back-illumination of the fiber(s) is turned off and in step 540 the optical fiber assembly is translated to be outside of the light path between the lens assembly and the pixelated detector. In step 542, the pixelated detector is used to acquire an image of the white screen with the mark(s) representing the locations of the fiber spot(s). In step 544, pixels corresponding to the mark(s) are defined, by using image analysis software to define aggregates of camera pixels corresponding to the imaged fiber spot area(s).

Step 546 involves recording the location of the center of each fiber spot in pixelated detector pixels $(X_{ref}, Y_{ref})$ in association with the corresponding stepper motor position, encoder reading, or some similar position sensor.

In one example, reference positions were located using the method above, $(X_{ref1}, Y_{ref1})$ and $(X_{ref2}, Y_{ref2})$ the respective number of steps $S_1$ and $S_2$ to go to these two locations would also be known. The rate of change of X pixel location, $R_x$, and Y pixel location Ry, as a function of motor steps, can now be calculated:

$$R_x = (X_{ref2} - X_{ref1})/(S_2 - S_1) \qquad \text{EQ. 1}$$

$$R_y = (Y_{ref2} - Y_{ref1})/(S_2 - S_1) \qquad \text{EQ. 2}$$

And for any other position of the stage with steps S, the position of the fiber is:

$$X = X_{ref1} + (S - S_1) * R_x \qquad \text{EQ. 3}$$

$$Y = Y_{ref1} + (S - S_1) * R_y \qquad \text{EQ. 4}$$

Using the equations above, a multitude of fiber locations can now be predicted.

In one embodiment of the invention, one or more of the fibers in the fiber assembly are dedicated for backlighting the optical system and locating the fiber locations. In one embodiment, the fiber that is illumination is electronically controlled within the instrument enclosure. In another embodiment, the fiber may be illuminated by a user-supplied illumination. Types of illumination suitable for this include, but are not limited to lasers, LEDs or VCSELs (vertical-cavity surface-emitting lasers).

In the manufacturing process, the locations of a multitude of the fibers for measurement and illumination in the assembly may be located using the methods above. In service or periodically by the user, the dedicated fiber(s) for illumination may be used to validate the fiber assembly is in the assumed location.

D. Data Augmentation

Figure 25:
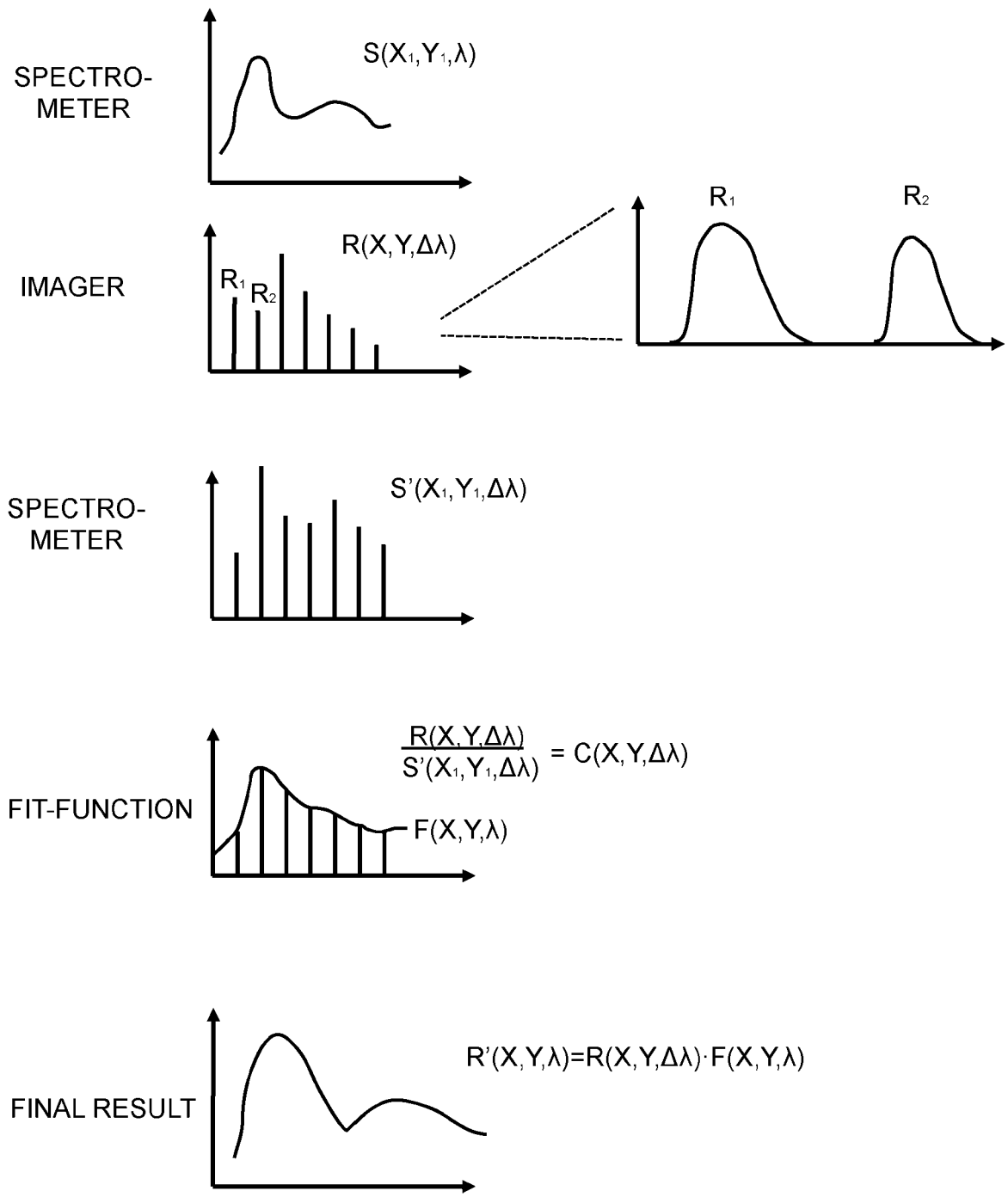
FIG. 25 illustrates a method for improving the shape of measured spectra, according to an embodiment of the present invention.

In the case of multi-spectral imaging where the imaging system spectral sampling interval is less than that used by the spot spectrometer, the imaging data can be augmented by the spectrometer. For example, referring to FIG. 25 and distinguishing multi-spectral bands from nearly continuous spectra: the spot spectrometer measures 1000 data points spanning 300 nm to 800 nm, forming the continuous spectral radiance, $S(X_1, Y_1, \lambda)$ at one representative location $(X_1, Y_1)$ in the scene; next, an imaging system measures seven 20 nm spectral bands centered at $\Delta\lambda$=400, 450, 500, 550, 600, 650 and 700 nm at all scene locations sampled by the pixels (X,Y) of the pixelated detector, forming a pixelated multi-spectral dataset, $R(X,Y,\Delta\lambda)$; next, 20 nm wide sub-spectra of $S(X_1, Y_1, \lambda)$ centered at the same wavelengths sampled by the imaging system are individually integrated to form a new spectral radiance dataset, $S'(X_1, Y_1, \Delta\lambda)$; the imaging system multi-spectral dataset, $R(X, Y, \Delta\lambda)$ is then divided by the spectral radiance dataset, $S'(X_1, Y_1, \Delta\lambda)$ to yield a scalar multi-spectral dataset, $C(X,Y,\Delta\lambda)$, at all pixels (X,Y); the scalar multi-spectral dataset $C(X, Y, \Delta\lambda)$ is then functionally fit (i.e. using a polynomial, exponential, linear, logarithmic, power, multi-modal, or other fit) for all or a portion of the measured spectral range, giving scalar dataset $F(X,Y,\lambda)$; finally, the pixelated multi-spectral dataset $R(X,Y,\Delta\lambda)$ is scaled and smoothed (i.e. gaps filled) by $F(X,Y,\lambda)$ resulting in continuous spectra at all pixel locations (X,Y), giving $R'(X,Y,\lambda)$.

In another embodiment, the spot spectrometer measures a multitude of locations in the field of view to create the dataset $S(\Delta X, \Delta Y, \lambda)$. By expanding upon the example detailed above, one can derive a scalar dataset $C(X,Y,\Delta\lambda)$ which has been made more spatially accurate by considering the spectral measurements from multiple locations of the scene rather than only considering one location, $(X_1, Y_1)$. Similarly, a three-dimensional fitting function could be created to express this dataset mathematically where the fitting domains are spatial (X, Y), and spectral (A).

The methods in the example above are able to generate a more detailed and wider range spectrum with no gaps in the data at all pixelated detector measurement locations. From R'(X, Y,λ), new evaluations of the data may be computed such as CIE 1931 chromaticity x,y.

Persons skilled in the art will know that these methods are equally valid for three-dimensional space; that, when using other coordinate systems such as spherical polar, there are many methods to fit datasets to a mathematical function; and that the explained methods above are example embodiments.

Alternately, in the case of multi-spectral imaging where the imaging system spectral sampling interval is less than that used by the spot spectrometer, the pixelated imaging data can be augmented by the spectrometer. For example, referring to FIG. 25 and distinguishing multi-spectral bands from nearly continuous spectra: the spot spectrometer measures 1000 data points spanning 300 nm to 800 nm, forming the continuous spectral radiance, S(X1,Y1,λ) at one representative location with radius r centered at (X1,Y1) in the scene; next, an imaging system measures seven narrow spectral bands centered at λ=400, 450, 500, 550, 600, 650 and 700 nm at all scene locations sampled by the pixels (X,Y) of the pixelated detector, forming a pixelated multi-spectral dataset, R(X,Y,λ). The average values for R(X,Y,λ) at (X1,Y1) with radius r is calculated as R1(X1,Y1,λ).

R1(X1,Y1,λ) can be thought of as seven data points of the spectrum, and if the imager and spectrometer are properly calibrated, the values for each wavelength should have the same radiometric values when sampling the same spot, i.e. the value from the imager R1(X1,Y1,400) matches the spectrometer S(X1,Y1,400) and R1(X1,Y1,450) matches the spectrometer S(X1,Y1,450), and so on. At any specific pixel (X, Y) in the field of view, the relative values of R at the seven wavelengths will vary. A computation can be made to increase the spectral data interval measured by the pixelated detector by referencing the spectrometer's higher resolution spectral data. For example, if we want to estimate n−1 equally spaced spectral data points between two radiance measurements made by the pixelated imaging detector at wavelengths A and B, where B>A, and the radiance values can be denoted by R(Xi, Yj,A) and R(Xi, Yj, B) where Xi and Xj denote a specific pixel in the image.

The measured, high resolution spectrum from the spectrometer S(X1, Y1, A) should be smoothed to create S'(X1, Y1, A) using boxcar filtering covering a wavelength range of (B−A)/n. The values needed are of for wavelengths A+(n−m)*(B−A)/n, where m has values from 1 to n−1. The spectrum S'(X1,Y1, A) can report radiance values at A+(n−m)(B−A)/n, where m has values from 1 to n−1, $$R(Xi, Yj, A + (n-m)*(B-A)/n) = \qquad \text{EQ. 5}$$
$$S'(X1, Y1, A + (n-m)*(B-A)/n) *$$
$$(R(Xi, Yj, A)*(n-m)/n + R(Xi, Yj, B)*m/n)/$$
$$(S'(X1, Y1, A) + S'(X1, Y1, B))$$

By expanding upon the example detailed above, one can derive a scalar dataset C(X, Y,Δλ) which has been made more spatially accurate by considering the spectral measurements from multiple locations of the scene rather than only considering one location, (X1,Y1). Similarly, three-dimensional fitting function could be created to express this dataset mathematically where the fitting domains are spatial (X, Y), and spectral (A).

The methods in the example above are able to generate a more detailed and wider range spectrum with no gaps in the data at all pixelated detector measurement locations. From R'(X, Y,λ), new evaluations of the data may be computed such as CIE 1931 chromaticity x,y. Persons skilled in the art will know that these methods are equally valid for three-dimensional space; that, when using other coordinate systems such as spherical polar, there are many methods to fit datasets to a mathematical function; and that the explained methods above are example embodiments.

E. Omitting Measurements

Many spectral measurements of real-world phenomena contain regions of smoothly varying data while also having low dynamic range. These spectra may be accurately modeled using simple reconstruction algorithms. In the embodiments wherein the imaging instrument contains hyperspectral or multispectral filters as well as a spot spectrometer, a first analysis of the spot spectral measurement can provide detail as to where there is critical spectral content and where there is none.

Let us consider the example of measurements of a white LCD display which is backlit with a multitude of red, green and blue LEDs. Across the display surface and as a result of dimming, diffuser non-uniformities, etc., variation in the relative heights of the measured red, green and blue LED spectral peaks may be observed, and the location of the spectral peaks may shift to shorter or longer wavelengths depending upon the temperatures of the LEDs. However, the shape of the red, green and blue LED spectra may be quite consistent. When the full spectrum at one location on the display is characterized, a reconstruction model can then be created for portions of the LED spectra relative to the measured peak wavelengths. To illustrate, a reconstruction model for the portion of the spectrum measured by the spot spectrometer from 350 nm to 480 nm may be created when the LCD is set to emit blue. If the blue LCD setting is also measured by the imaging system but only in the range from 450 nm to 480 nm, estimates for the unmeasured imaging system range from 380 nm to 450 nm may be generated by referencing the reconstruction model. Similarly, other sections of the spectrum may be similarly omitted from the imaging measurement and then later derived from reconstruction models.

Additionally, consider the application where the user wishes to measure the luminance and chromaticity of an LED RGB display with the hyperspectral or multispectral imaging system accurately, but in the least amount of time possible. An evaluation of spot spectrometer measurements acquired of the display reveals that the spectral regions more than 30 nm shorter than a blue peak at 465 nm have a negligible contribution to the luminance and a negligible contribution to the chromaticity results. In this case, preassessment of the display by the spot spectrometer can be used to devise a hyperspectral or multispectral imaging system measurement recipe wherein the wavelength bands below 435 nm are omitted, thus achieving the required accuracy in fewer measurements and hence shorter overall measurement time than if data below 435 nm were acquired. The exposures required to measure all remaining wavelengths of interest with the hyperspectral or multispectral imager could be estimated by comparison of the spot spectral measurement data and the sensitivity of the hyperspectral or multispectral imager.

From this brief case study, a strategy to improve the measurement times for the imaging system is apparent: Firstly, obtain advance knowledge of the scene to be measured by the imaging system via first measuring the scene with the spot spectroradiometer. Secondly, analyze the spectrum to determine which wavelengths or ranges of wavelengths are not needed to be measured for the intended application. They may be of very low signal strength and inconsequential in the desired integral results such as luminance and chromaticity. In other cases, the signal may be low and ignored for the spectral measurement, but added in as a correction to the integral measurement such as luminance, radiance or tristimulus X etc. In other cases, the data to be disregarded may be adequately predicted from other spectral data as in the case described above where only the LED peak region needs to be sampled to derive the entire LED spectrum. Thirdly, utilize knowledge of the spectral sensitivity ranges at various exposures and using various filters of the imaging system to predict a time-optimized set of imaging system settings to use to measure the scene.

By extension, by acquiring spot spectroradiometer measurements of the brightest and dimmest areas of interest in a scene, reasonable determinations of the light level ranges that are important to quantify for each imaging system setting (i.e. filter selection) may be obtained. Thus, an imaging system measurement sequence may be derived with a sufficient set of short and long exposures, and potentially neutral density filters, to measure the required dynamic range of interest in the scene with all imaging system filters required in the sequence.

F. Filter Error Correction

It is a common technique to correct the filtering error of the entire area of the pixelated detector within an imaging colorimeter by referencing a measurement made by a spectroradiometer of a location in a scene measured by both devices. However, while this correction is valid for the commonly sampled measurement area, it is deficient when the spectral responsivity of the imaging system is not spatially uniform across the entire area of the pixelated detector. In many imaging colorimeter designs, the filters are located between a lens and the camera sensor, and not located in collimated space (embodiments disclosed in U.S. Pat. No. 8,482,652B2 are examples). In these instruments, light from the lens exit pupil goes through the filter(s) at a range of angles to each location on the sensor. For a large 35 mm camera sensor and an electronic focus (EF) lens set to a small iris, light on the optical axis is nearly collimated, and the path length through the filter to the center of the sensor will be minimized. However, at the corners of the camera sensor, the light rays could be 23° or more from normal, depending upon the exact position of the exit pupil of the lens. The path length of the light rays travelling through the glass filter at 23° away from the optical axis is over 8% longer than the path of the light rays traversing the filter along the optical axis. This causes significant spectral filtering disparity at the corners as compared to light rays exiting the lens normal to the pixelated detector's center.

Consider that the transmission, T(A) of the glass is described by the Beer-Lambert Law:

$$T(\lambda) = 10^{-E(\lambda)L} \qquad \text{EQ. 6}$$

where E(A) is attenuation of the material as a function of wavelength, and L is the thickness of the material. For example, a colored glass has transmission values of 75% and 5% at wavelengths $\lambda_A$ and $\lambda_B$ respectively when the light rays traverse the glass at normal angles. That same colored glass would have transmission values reduced to 73% and 3.7% for wavelengths $\lambda_A$ and $\lambda_B$ respectively if the angles were tilted such that the path lengths of those light rays were increased by 10%. In general, the spectral transmission of the filter is path length dependent.

Figure 26:
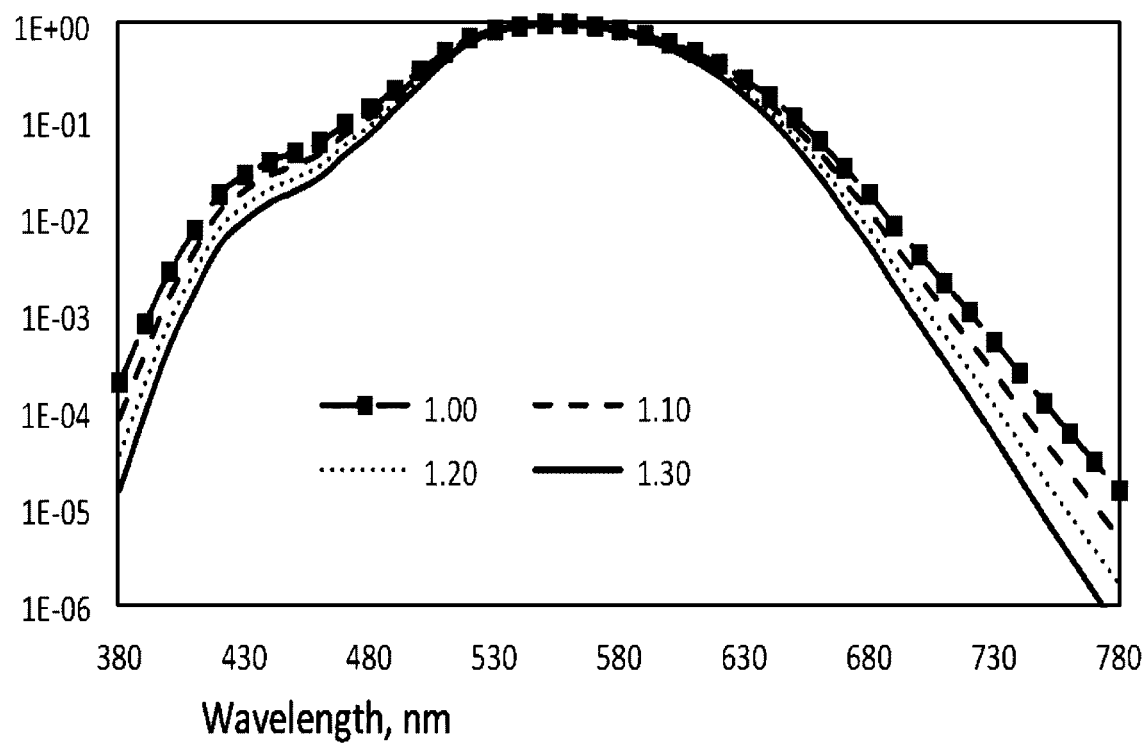
FIG. 26 shows a normalized plot of a filter's transmission with relative path lengths of 1, 1.1, 1.2 and 1.3.

FIG. 26 indicates how the transmission of such a colored glass filter changes as a function of wavelength and optical path length traversed, on a log scale. It shows how the spectral transmission of a bulk absorbing filter changes if the path length of a light ray traversed through the filter is increased by 10%, 20% and 30% from the nominal (normal, optical axis). Thin film filters have a more complicated relationship between incident angle and spectral transmission: the amplitude, peak wavelength and bandpass shape can all change as a function of angle.

Figure 27:
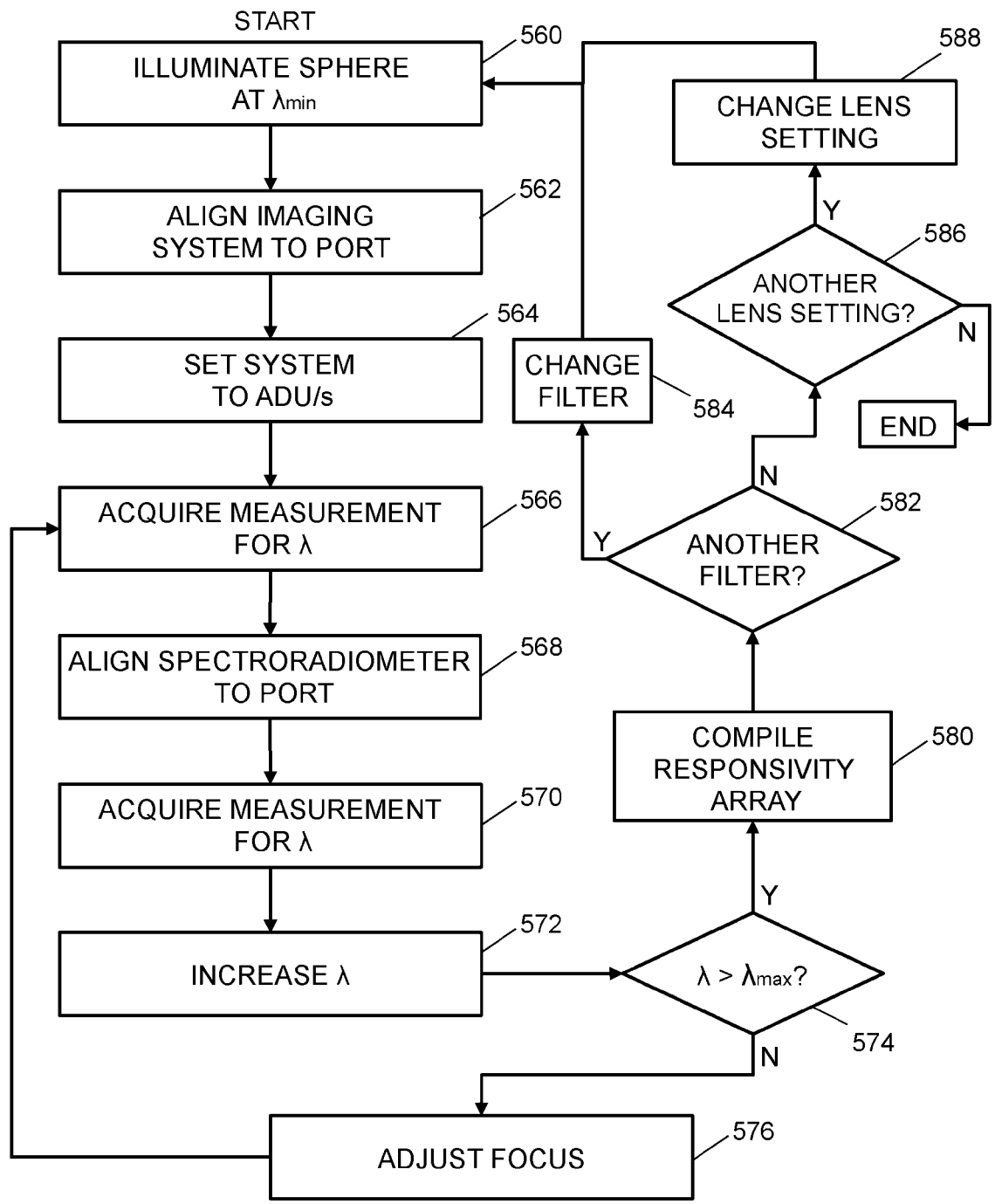
FIG. 27 is a flowchart for correcting for filter error, according to an embodiment of the present invention.

Considering the errors that can result in an imaging colorimeter measurement as a result of the wavelength-dependent transmission variability for light rays traversing a colored glass filter, one method to generate a spatially dependent spectral responsivity of an imaging system is shown in FIG. 27.

Step 560 is to illuminate an integrating sphere with monochromatic light at wavelength $\lambda_{min}$, where $\lambda_{min}$ is the shortest wavelength to be measured by the system. Step 562 is to align the imaging system to be calibrated such that its full field of view measures the uniform radiance light field (with wavelength $\lambda_{min}$) emanating from the measurement port of the integrating sphere. Step 564 is to configure the imaging system such that each image pixel reports analog to digital units per second (ADU/s). This requires that each pixel in each image acquired by the system must be divided by the exposure time used, in seconds.

Step 566 is to acquire a measurement of light from the integrating sphere measurement port using the imaging system and note the wavelength of the monochromatic light emanating from the measurement port. Step 568 is to align a calibrated spectroradiometer, providing spectral radiance in units of W/(sr·m²)/nm, to the another measurement port of the integrating sphere. Step 570 is to acquire a measurement of the second sphere measurement port using the spectroradiometer and note the wavelength of the monochromatic light emanating from the measurement port.

Step 572 is to increase the wavelength of the light illuminating the sphere by Δλ (for example Δλ=10 nm). If, in step 574, the longest (desired) wavelength ($\lambda_{max}$) is not exceeded (for example $\lambda_{max}$=1100 nm), then optionally adjust the lens focus in step 576 to keep the field of view constant. Track the lens focus setting for each wavelength if it is changed. Steps 566, 570, 572 are repeated until the longest (desired) wavelength ($\lambda_{max}$) has been achieved (for example $\lambda_{max}$=1100 nm) in step 574.

Step 580 is to combine the measurements from step 566 into a wavelength-ordered 3D spectral responsivity array with dimensions of horizontal image pixel index (X), vertical image pixel index (Y), and monochromatic wavelength (A), r(X,Y,λ). Each element in this 3D array is in units of ADU/s, which can be optionally normalized to the maximum ADU/s value in the dataset. Should absolute units be preferred, each imaging system measurement should first be divided by the corresponding spectral radiance measured in step 570, thus providing units of (ADU/s)/(W/(sr·m²)/nm).

The process above is then repeated with all filters in the imaging system, following step 582, if there are any more filters, and step 584 in which the filter is changed. For example, an imaging colorimeter with three filters would have three corresponding wavelength-ordered 3D spectral responsivity arrays: $r_{tri\_X}(X,Y,\lambda)$, $r_{tri\_Y}(X,Y,\lambda)$ and $r_{tri\_Z}(x,y,\lambda)$, where subscripts tri_X, tri_Y, and tri_Z identify the imaging system filter. The process may also be repeated for different lenses or lens settings to generate other spatially dependent spectral responsivity 3D arrays for the imaging system. In step 586, it is determined whether there is another lens setting to be calibrated, and if so, the lens setting is changed in step 588. If lens focus adjustments are done in step 576, above, then those same lens settings should be used for the measurements using the above calibration.

Alternately, step 566 is to acquire a 2D, pixelated measurement of light from the integrating sphere measurement port using the imaging system and note the wavelength of the monochromatic light emanating from the measurement port. Step 568 is to align a calibrated spot spectroradiometer, providing spectral radiance in units of W/(sr·m²)/nm, to another or the same measurement port of the integrating sphere. Step 570 is to acquire a measurement of the sphere using the spot spectroradiometer and note the wavelength and radiance of the monochromatic light emanating from the measurement port.

Step 572 is to increase the wavelength of the light illuminating the sphere by $\Delta\lambda$ (for example $\Delta\lambda$=10 nm). If, in step 574, the longest (desired) wavelength ($\lambda_{max}$) is not exceeded (for example $\lambda_{max}$=1100 nm), then if the focus is normally adjusted as a function of wavelength and corrected for registration errors, adjust the lens focus as needed use these functions and apply the registration corrections in step 576. Steps 566, 570, 572 are repeated until the longest (desired) wavelength ($\lambda_{max}$) has been achieved (for example $\lambda_{max}$=1100 nm) in step 574.

In step 580 each imaging system measurement should first be divided by the corresponding spectral radiance measured in step 570, thus providing the responsivity r, with units of (ADU/s)/(W/(sr·m²)/nm) at every pixel and at the wavelength stepping interval $\Delta\lambda$. The resulting dataset is a wavelength-ordered 3D spectral responsivity array with dimensions of horizontal image pixel index (X), vertical image pixel index (Y), and monochromatic wavelength ($\lambda$), r(X, Y,$\lambda$). Each element in this 3D array is in units of ADU/s/(W/(sr·m²)/nm) or just ADU/s or even % if the dataset is normalized is normalized to the maximum responsivity or ADU/s value in the dataset.

Following step 582, the process above is repeated in step 584 with all filters in the imaging system. For example, an imaging colorimeter with three filters would have three corresponding wavelength-ordered 3D spectral responsivity arrays: $r_{tri\_X}(X,Y,\lambda)$, $r_{tri\_Y}(X,Y,\lambda)$ and $r_{tri\_Z}(X,Y,\lambda)$, where subscripts tri_X, tri_Y, and tri_Z identify the imaging system filter. The process may also be repeated for different lenses or lens settings to generate other spatially dependent spectral responsivity 3D arrays for the imaging system. In step 586, it is determined whether there is another lens setting to be calibrated, and if so, the lens setting is changed in step 588. If lens focus adjustments are done in step 576, above, then those same lens settings should be used for the measurements using the above calibration. Then compute F1' as a function at each pixel or for regions in the imager field of view. Then predict colorimetry errors as a function of field of view for the instrument. If the spot spectroradiometer can scan across the field of view, then a color correction can be made as a function of pixel number from the optical axis.

The process may be applied to other filtered systems including, but not limited to imaging photometers, imaging radiometers, imaging colorimeters, multi-spectral imagers and hyperspectral imagers.

Here is one method to apply a spatially dependent spectral responsivity correction to a measurement acquired by an imaging colorimeter with an integrated spot spectroradiometer: Measure an unknown source (such as an LCD display) with the integrated spot spectroradiometer, giving S($\lambda$), the measured spectral radiance and calculated tristimulus integrals sX, sY and sZ. Measure the same unknown source with the imaging colorimeter, giving icX(X,Y), icY(X, Y) and icZ(X,Y), the imaging colorimeter's tristimulus measurements at each pixelated detector's pixel location, (X,Y). Within these measurements, the pixels corresponding to the spot on the unknown source sampled by the spectroradiometer, are used to calculate tristimulus values ic_sX, ic_sY and ic_sZ as measured by the imaging colorimeter. A simple correction is derived which is the scalar needed to adjust the imaging colorimeter measurement to match that of the spot spectroradiometer, for each imaging colorimeter filter. Such correction scalars are:

$$c1X = sX / \text{ic\_sX} \qquad \text{EQ. 7}$$

$$c1Y = sY / \text{ic\_sY} \qquad \text{EQ. 8}$$

$$c1Z = sZ / \text{ic\_sZ} \qquad \text{EQ. 9}$$

These first order scalar values are then applied to the respective imaging colorimeter measurements, giving corrected imaging colorimeter measurements icXcorr(X,Y), icY corr(X,Y), and icZcorr(X,Y):

$$icX\text{corr}(X, Y) = icX(X, Y) \cdot c1X \qquad \text{EQ. 10}$$

$$icY\text{corr}(X, Y) = icY(X, Y) \cdot c1Y \qquad \text{EQ. 11}$$

$$icZ\text{corr}(X, Y) = icZ(X, Y) \cdot c1Z \qquad \text{EQ. 12}$$

If the spatially dependent spectral responsivity of the imaging system is known for a given filter assembled within the system, then the spatial variation in detector response may be compensated by deriving and applying a unique scalar for each pixelated detector pixel location (X,Y), using the following steps: Using the imaging system pixels corresponding to the spot on the unknown source also sampled by the spectroradiometer, the average spectral responsivity is calculated for the imaging system at a location coincident with the spot spectroradiometer location, giving:

$$r_{ic\_SX}(\lambda) = \text{AVERAGE}\{r_X(X, Y, \lambda)\} \qquad \text{EQ. 13}$$

$$r_{ic\_SY}(\lambda) = \text{AVERAGE}\{r_Y(X, Y, \lambda)\} \qquad \text{EQ. 14}$$

$$r_{ic\_SZ}(\lambda) = \text{AVERAGE}\{r_Z(X, Y, \lambda)\} \qquad \text{EQ. 15}$$

A scalar is then computed for every pixel in the imaging system, per filter assembled therein:

$$c2X(X, Y) = \int r_X(x, y, \lambda) \cdot S(\lambda) d\lambda \Big/ \int r_{XSS}(\lambda) \cdot S(\lambda) d\lambda \quad \text{EQ. 16}$$

$$c2Y(X, Y) = \int r_Y(x, y, \lambda) \cdot S(\lambda) d\lambda \Big/ \int r_{YSS}(\lambda) \cdot S(\lambda) d\lambda \quad \text{EQ. 17}$$

$$c2Z(X, Y) = \int r_Z(x, y, \lambda) \cdot S(\lambda) d\lambda \Big/ \int r_{ZSS}(\lambda) \cdot S(\lambda) d\lambda \quad \text{EQ. 18}$$

These scalars are then applied to the measurements obtained by the imaging colorimeter, per respective filter. The corrected imaging colorimeter tristimulus values at each pixel (X,Y) are thus:

$$icX\text{corr}(X, Y) = c2X(X, Y) * icX(X, Y) \quad \text{EQ. 19}$$

$$icY\text{corr}(X, Y) = c2Y(X, Y) * icY(X, Y) \quad \text{EQ. 20}$$

$$icZ\text{corr}(X, Y) = c2Z(X, Y) * icZ(X, Y) \quad \text{EQ. 21}$$

Note that the spatial correction is weighted by the spectral power distribution of the source being measured and the spectral responsivity at each pixel.

For some imaging systems the spatially dependent spectral responsivity may be rotationally symmetric (perhaps about the optical axis) and as a result, the spatially dependent spectral responsivity may be expressed as a function of distance from the optical axis.

With the translating spot spectroradiometer, the measurement of spectral radiance $S(\lambda)$, calculation of tristimulus integrals sX, sY and sZ, and derivation of all corresponding corrections, can be performed at one or more locations in the scene. By extension, further translation of the spot spectroradiometer to locations not yet measured allows additional spectroradiometer measurements of the scene to be obtained for the purpose of verifying any corrections derived for, and applied to, the imaging system.

G. Measuring RGB Displays

The method may be further extended for measurements of RGB displays. If the process above is repeated such that $S(\lambda)$ and scalar corrections are created for every pixel when an RGB display is set to red, green, blue and white, then a matrix color correction can be created at each pixel location using the methods described by Yoshi Ohno et al., National Institute of Standards and Technology, Gaithersburg, Maryland: "Four-Color Matrix Method for Correction of Tristimulus Colorimeters", Color Imaging Conference 1997: 301-305 and "Four-Color Matrix Method for Correction of Tristimulus Colorimeters—Part 2", Published in Proc., IS&T Sixth Color Imaging Conference (1998).

For the case of a scene comprised of more than one light source to be measured, using the aforementioned imaging system correction processes allows each light source to have its own color correction and acceptable chromaticity tolerance (i.e. color region). An uncorrected imaging colorimeter measurement may be suitably segmented and compared against a library of stored color regions with associated color corrections, and thus a multitude of color corrections may be applied to the imaging colorimeter measurement.

The method may also be expanded so that the correction is only applied if the uncorrected chromaticity is close to spectroradiometer chromaticity. For example, the uncorrected chromaticity coordinates (u',v') at any pixel location must each be within the color region with a radius of 0.09 and centered at chromaticity coordinates (u',v') by the spectroradiometer. Other shapes and definitions for color regions are possible. A set of unique spatial corrections may be made for a multitude of color or regions and applied selectively in a measurement. For example, green areas may have a different correction than the correction applied to red regions.

Some scenes being imaged may have more than one light source to be measured. Each light source may have its own spatial correction and its own color region. An uncorrected imaging colorimeter measurement may be compared against a library of color regions and a multitude of color corrections may be applied to a single measurement. These methods may be applied to other imaging instruments such as multispectral imagers and hyperspectral imagers.

H. Further Variations

Persons skilled in the art will readily understand that in the described embodiments above it is also possible to add various optical filters, either fixed or translated into the optical path at almost any position in the optical system. These filters can transform the measurement in many ways including, but not limited to: narrowing of the spectral measurement range, attenuation and/or polarization of light incident to the system, spectral filtering (e.g. tristimulus filters), etc.

Persons skilled in the art will also recognize that the optical fiber sub-assembly may be configured with a multitude of fibers, each with different attributes such as numerical aperture, core shape, core and cladding diameters, spectral transmission range, polarization properties, etc.

Persons skilled in the art will also recognize that all values, angles, dimensions, proportions, configurations etc., are given as examples and do not definitively define the properties of a particular embodiment.

The prism mirror may be replaced with any mirror or mirrored glass with a reflection angle of not necessarily 45 degrees, to deflect the light to the optical fiber.

Persons skilled in the art will readily understand that where a spectroradiometer has been described, a non-radiometrically calibrated spectrometer may also be substituted for some measurement applications and vice-versa.

When combined with an electronic focusing lens, the system may be refocused for different wavelength bands and the mirror/fiber assembly in turn may be translated to compensate for image shifting due to re-focusing. This procedure keeps the measurement spot(s) in focus for the same location(s) in the scene.

If the spectral spot measurement is calibrated at a multitude of locations for particular quantities such as luminance or chromaticity, then the spot spectrometer can acquire spatially differentiated measurements, which may in turn be used to provide a spatially variant correction of the pixelated detector's measurements. For example, the luminance correction could be fit to be a function of just one spatial variable such as the distance from the optical axis; or a function with two spatial variables: rectilinear pixel space (X,Y) or polar coordinate space (φ,θ) for example. The calibrations and corrections may be extended to include a multitude of measurement quantities.

In some implementations of a spot spectroradiometer, there may also be an integrated 2D spectral imager in the same instrument. For example, a filter wheel may contain a selection of spectrally selective filters that enable a multi-spectral or hyperspectral imager (e.g. patent U.S. Pat. No. 9,909,920B2 and patent application published with number US2022/0146309).

Alternatively, there may be an LVBF in addition to, or instead of the filter, 148 in FIG. 9. The LVBF is incrementally translated in front of the pixelated detector and a multitude of measurements are taken such that a multitude of light measurements at different wavelengths at each of the pixels in the pixelated detector are acquired. These spatio-spectral measurements may then be assembled into a hyperspectral data cube.

The spot spectroradiometer measurement results may be used to enhance the 3D hyperspectral or 2D filtered or unfiltered measurements of the pixelated detector in multiple ways. For example, a measurement by the spot spectroradiometer may be used to improve the accuracy of the multi-spectral data cube acquired by the pixelated detector by any or all of:
  filling in gaps where there is missing, noisy or corrupted spectral data;
  providing a more detailed model of the spectrum;
  extending the spectral data set to cover a wider wavelength range;
  providing a reference spectrum which can be used to select a set of exposure times to use for the multi-spectral measurements to be obtained by the pixelated detector.

Some or all of the functions of the device with an imaging detector may be controlled with one or more processors that execute computer-readable instructions stored in a non-transitory computer-readable memory.

Some of the embodiments of the invention have the 2D imager on the same optical axis as the lens or, the imager is on the axis via a mirror or beam splitter. Users familiar with optics will understand that, the embodiments are essentially equivalent if the positions of the imager and fiber optic assembly with stage are swapped relative to the mirror or beam splitter.

I. Industrial Applicability

The features and assemblies disclosed herein may provide one or more of the following advantages, depending on the configuration of the particular embodiment of the invention.

Obstruction-free and distortion-free imaging with the two dimensional pixelated detector: When the mirror and fiber sub-assembly are being used for measurement with a spectrometer, they occlude the two-dimensional pixelated detector. When the pixelated detector is being used, then the fiber and mirror sub-assembly is translated so as not to obstruct the illumination of the pixelated detector. By comparison, fixed-position beam splitters (which are always simultaneously present in the optical paths to the two dimensional pixelated detector and spectrometer) can cause unwanted image distortions, light scatter and ghosting artifacts.

Facilitating the measurement of multiple locations within the field of view: Whereas the prior art systems have a fixed measurement location and one optical fiber attached measuring device, the new invention can measure a multitude of locations by having a multitude of fibers, or by translating the stage, or by both methods.

Multiple spectra from a fiber array: Instead of a single optical fiber, there may be a rigid fiber sub-assembly with a multitude of optical fibers that are all aligned to the focal plane of the lens. The fibers may be coupled to multiple single-channel spectrometers, or to one or more multi-channel spectrometers. Optical fibers in the sub-assembly may additionally be connected to other light measurement devices.

Optimum focus: In another manifestation of the invention, there are a plurality of optical fibers connected to a plurality of spectrometers or other light measurement devices which may all have different spectral sensitivity ranges. To compensate for chromatic aberration of the lens, the fibers may be positioned at varying distances from the turning mirror depending upon the measurement wavelength range of the instrument connected to the end of each fiber.

Extended wavelength range measurement of a location within the lens field of view: Two or more optical fiber assemblies may be translated in some sequence such that they all measure (in focus) the same location within the field of view of the lens. If the fiber assemblies are connected to different spectrometers that have different wavelength ranges, then the wavelength measurement range is that formed by the union of the wavelength ranges from the individual spectrometers.

High positioning accuracy: Differing from common filter wheel systems, long travel translation slides can have accuracy specifications which achieve micron levels. Linear translation slides paired with high resolution encoders are available with 1 µm positioning accuracy. In comparison, the inventor has not evaluated a filter wheel positioning system with better accuracy than 20 µm. Furthermore, to date, the drive mechanisms evaluated for filter wheels have backlash and hysteresis in their motion, leading to rotation in only one direction being recommended for best rotational positioning accuracy.

Compact: Because the fiber guide is very close to the turning mirror and sensor, the mirror need not be very large. As a result, a smaller mirror means a reduced mass to translate and thus lower-cost components can be used for this sub-assembly. The inventor(s) have recognized that there are many applications that may benefit from an imaging spot spectrometer that consumes a small volume of space within the back focus region found between the camera lens and camera sensor. For example, an instrument could be created with two filter wheels in the optical path of the camera and there would still be enough volume remaining in front of the camera sensor within which a translating mirror assembly may be installed. For the application where a translation of the measurement spot(s) is desired, translation of the fiber(s) is a simple and economical solution. If the fiber(s) were fixed, the translation could alternatively be achieved by translating the entire camera assembly—which would be much more expensive and complicated.

Fast: Typically, as filter wheel size, mass, and rotation speed increase, so too do the rotational impulses exerted on the filter wheel as it is accelerated to leave a position or decelerated to arrive at a position. For a mirror assembled onto such a filter wheel along with other optical filters, these rotational impulses or vibrations can lead to mirror and filter positioning errors and other mechanical issues in the system. To counteract this problem: filter wheel rotation speeds, accelerations, and decelerations may be reduced, thus slowing the overall rotation speed of the filter wheel; or the size and mass of the entire instrument and corresponding mounting may need to be increased to reduce the system sensitivity to such vibrations and impulses. As mentioned above, the components which are assembled onto the linear slide are typically much smaller in size and mass due to the proximity of the linear slide to the camera sensor. Thus the distance the linear translation slide assembly must travel is shorter which depending upon its speed may yield positioning time savings.

Translation Stage Supports More Features: The mirror assembled onto the linear slide need only be large enough to couple and focus the light cone from the optical system onto the optical fiber at the desired position(s) in the field of view. Suitable linear translation slides exist that can support linear travel exceeding 300 mm—which is several times the width of a 35 mm camera sensor. The linear translation slide thereby can be used to insert other optical components into the optical path between the lens and the camera sensor such as Linear Variable Bandpass Filters (LVBFs), density filters, polarizers or tristimulus filters. Additional turning mirrors may be added to the stage to couple light sources not within the lens field of view to the pixelated detector or spectrometer, or to redirect light rays from sources not within the lens field of view such that they traverse through the instrument and exit the lens, for calibration and verification purposes.

Simple components: Whereas the turning mirror in the invention is realized using a simple, low cost rectangular prism mirror; the optimal shape for a turning mirror mounted in a filter wheel would likely need expensive, custom machining to optimize its function.

Again, depending on the configuration of the particular embodiment of the invention, one or more of the following disadvantages of the prior art are not present:

Beam splitter: Since the camera sensor, optical fiber, and lens optical axis are all fixed in position relative to one another, the fiber guide assembly must be positioned such that it does not occlude the light cone from the lens to the camera sensor. As a result, a beam splitter or mirror would need to be positioned sufficiently far from the camera sensor to provide a focal plane for the optical fiber which is outside of the light cone from the lens to the camera. This restriction would also force the capturing of a larger cone of light rays, and the size of the beam splitter or mirror would always be the same size as the camera sensor or larger. Consider a 43 mm diagonal or more for modern high resolution scientific cameras. With a back focus of 44.5 mm, fitting a beam splitting cube behind an EF lens and in front of the sensor leaves little remaining space. By comparison the height of a turning mirror in the proposed invention could consume 10 mm of space or less.

Rotating mirrors: For a system with a fixed optical fiber and turning mirror assembled on a rotating filter wheel, the fixed fiber must be positioned so as not to occlude the light cone from the lens to the camera sensor. As a result, the turning mirror may need to be quite far from the sensor and thus be quite large. This is especially true for fast lenses and large sensors. The large mirror will take up more space in the lens back-focus region, may be heavier, and thus the system may require mounting hardware and associated motors of increased size and cost.

Expensive Optics: Whereas in some of the novel embodiments described above, the translating mirror size is practically invariant with the camera sensor size, the fixed-position optical fiber designs utilizing turning mirror or beam-spitting optics may be larger, heavier and more expensive.

Image artifacts: Careful design, mounting and alignment of beam splitters would be needed to avoid certain types of image distortion, polarization problems, ghost images and light scatter.

Complicated spectral scanning across the field of view: Traditionally, to scan a spectral spot(s) across the scene, the entire instrument would be translated or rotated in one or two dimensions. The external mechanical stages, robots, etc., required to facilitate such motion need significant time to set up and may be very expensive. By comparison, a feature of some embodiments of the invention is a system to translate an internal turning mirror and fiber to facilitate spectral spot measurements at multiple locations across the scene, eliminating the requirement for one dimension of external scanning hardware.

J. Numbered Embodiments

1. An imaging system comprising: a lens; an pixelated detector; an optic fiber assembly mounted on the translation stage, which moves an entrance surface of the optic fiber(s) into one or more positions within a focal plane of the lens; and wherein there is a mechanical stage and mirror between the lens and fiber optic assembly such that the stage can position the mirror so that an image is formed at the pixelated detector plane or at the plane of the optic fiber assembly; or wherein there is a fixed beam splitter and between the lens and fiber optic assembly such that an image is formed at both the pixelated detector plane and at the plane of the optic fiber assembly; and wherein there are no lenses between a plane in which the translation stage is moved and the pixelated detector.
2. An imaging system comprising: a lens; a two-dimensional array detector; a translation stage; and an optic fiber assembly mounted on the translation stage, which moves an entrance surface of the optic fiber assembly into one or more positions within a focal plane of the lens; a beam splitter between the lens and a plane in which the translation stage is moved; wherein part of the light that passes through the lens is focused onto a two-dimensional array detector and part of the light is imaged onto the optic fiber assembly.
3. (FIGS. 7-9) An imaging system comprising: a lens; a two-dimensional array detector; a fiber optic assembly a translation stage; and a turning mirror. The turning mirror and fiber optic assembly are mounted on the translation stage, which moves an entrance surface of the optic fiber into one or more positions within a focal plane of the lens. The translation stage may also be positioned to allow light from the lens to focus onto the two-dimensional array detector.
4. The imaging system of embodiment 1, 2 or 3 wherein the optic fiber assembly transmits light, which has passed through the lens, to a measurement device.
5. The imaging system of embodiment 1, 2 or 3 wherein the translation is in two dimensions.
6. The assembly in embodiment 1, 2 or 3 wherein the fiber assembly may be translated to collect light from a multitude of in-focus positions.
7. The embodiment of 1, 2 or 3 wherein there is an accompanying change in the focus of the lens with each corresponding fiber positioning action in order to provide optimal focus when the fibers are sampling different wavelength ranges of light.
8. The fiber guide assembly in embodiment 1, 2 or 3 wherein there are a plurality of optical fiber guides connected to a plurality of single-channel spectrometers or one or more multi-channel spectrometers or other light measurement devices.
9. The assembly in embodiment 1, 2, 3, 4 or 8 wherein the optic fiber assembly is not on the translation stage and fixed, wherein the translation stage includes one or more of optical filters such that the light reflected off the mirrored surface may pass through a filter before being focused onto the optical fiber(s) and that by translating the stage a different filter or no filter may be inserted so as to change the filtering of the light focused onto the optical fiber(s).
10. The assembly in embodiment 1-8 above wherein two or more fibers of the assembly may be translated such that they sequentially sample the light at a common location in the focal plane.
11. The assembly in embodiment 10 above wherein two or more fibers are connected to two or more different spectrometers covering different wavelength regions and wherein the spectra are stitched together in software to report a wider wavelength range measurement at that location.
12. The assembly in embodiment 1, 2 or 3 wherein the section of the translating stage containing the turning mirror is constructed such that when the mirror is in position to deflect light to the optical fiber assembly, the pixelated detector is blocked from any incoming light.
13. The assembly in embodiment 1, 2 or 3 wherein the section of the translating stage containing the turning mirror is constructed such that via translation of the stage, one or more fibers in the optical fiber assembly may be blocked from any incoming light.
14. The assembly of embodiment 1, 2 or 3 wherein the translation stage also translates transmissive optical filters for imaging with the pixelated detector.
15. The assembly of embodiment 1, 2 or 3 wherein the translation stage also translates any of, but not limited to: additional prisms; beam splitters; clear glass; transmissive filters (thin film, absorbing, polarizing, linear variable bandpass); or an opaque panel to block light.
16. The assembly of embodiment 1, 2 or 3 wherein one or more optical attenuation filters, or spectral or polarizing filters are inserted into the optical path between the lens and the translation stage via rotating filter wheel(s), additional linear translation stages or other mechanical insertion mechanisms.
17. In another embodiment of 1, 2 or 3 one or more fibers in the fiber optic assembly are back-illuminated such that light can be emitted out through the lens.
18. A spectrally filtered, unfiltered, multispectral or hyperspectral imager that also incorporates a method whereby one or more spot spectrometer measurements are used to estimate the exposure times required for the imager to capture the desired data.
19. The method in embodiment 18 wherein the spot spectrometer measurement is used to predict some wavelengths or wavelength regions of the hyperspectral or multispectral measurement are small or insignificant contributions to the desired measurement integrals and not measured or measured, but not considered in the exposure time optimization.
20. The method in embodiment 18 and wherein spectral data at some wavelengths are omitted from, or out of the range of the multispectral or hyperspectral imager measurements and later added as interpolations or extrapolations to the imager data set by prediction derived the spot spectral measurements.
21. A light measurement system comprising a spot spectrometer and images that are spectrally filtered as in, but not limited to embodiments in 1, 2, 3, 9 and 16; and wherein the imaging assembly produces multispectral or hyperspectral images; and the method wherein the measurements from the spot spectrometer measurement(s) are used to estimate the exposure times required for the hyperspectral or multispectral imaging set.
22. The method wherein a display is measured at one location with a spectroradiometer for the primaries (red, green and blue) and white; and the imaging instrument also measures the chromaticity of the display at the same display settings.
23. A translating stage onto which a multitude of fibers is mounted and that the stage may be translated such that only one fiber or a limited number of fibers in the assembly is aligned with a light limiting aperture. By programmatic control of the translation different fiber(s) may be positioned in front of the light limiting aperture.
24. The embodiment 23 where there is a lens assembly on one or both sides of the light limiting aperture.
25. The embodiment 23 wherein there are micro lenses attached to one or more fibers.
26. The embodiment 23 wherein the fiber cores are 1 mm or smaller in diameter.
27. The embodiment 23 wherein the output is the entrance slit of a spectrometer
28. The embodiment 23 wherein the output is another fiber assembly.
29. The embodiment 23 wherein there are a multitude of limiting apertures and m output fibers may be optically connected to n input fibers via translation of the stages containing m or n fibers.

The invention claimed is:
1. An optical device comprising:
one or more lenses providing a first image focal plane;
a mirror providing a second image focal plane of the one or more lenses;
a pixelated detector at the first image focal plane, the pixelated detector being taller, wider or both taller and wider than the mirror;
a translation stage upon which the mirror is mounted; and
an optical fiber positioned so that an entrance face of the optical fiber is in the second image focal plane;
wherein the translation stage translates the mirror between a position in which it provides the second image focal plane and a position in which it does not provide the second image focal plane.
2. An optical device comprising:
one or more lenses providing a first image focal plane;
a mirror providing a second image focal plane of the one or more lenses;
a pixelated detector at the first image focal plane;
a translation stage upon which the mirror is mounted;
an optical fiber positioned so that an entrance face of the optical fiber is in the second image focal plane; and
on the translation stage, one or any of: a prism, a beam splitter, clear glass, a thin film filter, an absorbing filter, a polarizing filter, a linear variable bandpass filter, an opaque panel;
wherein the translation stage translates the mirror between a position in which it provides the second image focal plane and a position in which it does not provide the second image focal plane.
3. The optical device of claim 1 or 2, wherein the translation stage is translatable from a position where it does not occlude the pixelated detector to a position where it partially or completely occludes the pixelated detector.
4. The optical device of claim 1 or 2, wherein the translation stage is translatable from a position where it does not occlude the optical fiber to a position where it partially or completely occludes the optical fiber.

5. The optical device of claim 1, wherein:
there is exactly one lens that provides the first image focal plane; and
the second image focal plane is a focal plane of said exactly one lens.

6. The optical device of claim 1 or 2, comprising a filter wheel with one or more optical filters, the filter wheel located between the one or more lenses and the mirror.

7. The optical device of claim 1, comprising one or more further optical fibers each having a further entrance face positioned in the second image focal plane.

8. The optical device of claim 1 or 2 wherein there are no lenses between a plane of translation of the translation stage and the pixelated detector.

9. The optical device of claim 1 or 2, wherein the translatable stage supports at least one color filter, at least one neutral density filter, or at least one color filter and at least one neutral density filter in front of either or both of the pixelated detector and the optical fiber.

10. The optical device of claim 1 or 2, wherein a location of the one or more lenses is adjustable depending on a wavelength of light captured by the optical fiber.

11. The optical device of claim 1 or 2, comprising a reference light source that directs light into the optical fiber.

12. The optical device of claim 1 comprising, on the translation stage, one or any of: a prism, a beam splitter, clear glass, a thin film filter, an absorbing filter, a polarizing filter, a linear variable bandpass filter, an opaque panel.

13. The optical device of claim 1 or 2, comprising a further translation stage on which an exit end of the optical fiber is mounted.

14. The optical device of claim 1 or 2, wherein the mirror is curved or segmented.

15. An optical device comprising:
one or more lenses providing an image focal plane;
a mirror providing another image focal plane of the one or more lenses;
a pixelated detector at a first one of said image focal planes;
a translation stage that translates parallel to a second one of said image focal planes; and
an optical fiber mounted on the translation stage so that an entrance face of the optical fiber is translatable in the second one of said image focal planes;
wherein there are no lenses between a plane of translation of the translation stage and the pixelated detector.

16. The optical device of claim 15, wherein:
there is exactly one lens that provides the image focal plane; and
the other image focal plane is a focal plane of said exactly one lens.

17. The optical device of claim 16, wherein said exactly one lens is a compound lens.

18. The optical device of claim 16, wherein:
the mirror is mounted on the translation stage; and
the optical device comprises a selectable filter between said exactly one lens and the mirror.

19. The optical device of claim 15, comprising a filter wheel with one or more optical filters, the filter wheel located between the one or more lenses and the mirror.

20. The optical device of claim 15, wherein the mirror is in a fixed position relative to the one or more lenses.

21. The optical device of claim 20, wherein:
the mirror is a 100% reflecting mirror; or
the mirror is a beam-splitter; or said second one of said image focal planes is provided by the one or more lenses and the mirror has a reflective surface in which there is a central transparent aperture; or
said second one of said image focal planes is provided by the mirror and the mirror has a central reflective spot surrounded by a transparent surface; or
said second one of said image focal planes is provided by the one or more lenses and the mirror has a reflective surface in which there is are multiple transparent apertures; or
said second one of said image focal planes is provided by the mirror and the mirror has multiple reflective spots surrounded by a transparent surface.

22. The optical device of claim 15, comprising:
one or more focusing lens elements between the mirror and the entrance face of the optical fiber;
one or more other focusing lens elements between the mirror and the pixelated detector;
wherein:
the mirror is tilted relative to an optical axis of the one or more lenses;
light from the one or more lenses focuses at an intersection of the optical axis and a surface of the mirror;
the mirror has an aperture therein at the optical axis or within 10% of a width of the mirror from the optical axis;
a minor fraction of the light passes through the aperture and is focused on the entrance face of the optical fiber, and
the remaining fraction of the light is focused onto the pixelated detector.

23. The optical device of claim 22, wherein the mirror has one or more further apertures, the mirror translatable so that each of the further apertures is positionable on the optical axis or within 10% of the width of the mirror from the optical axis.

24. The optical device of claim 15, wherein:
said first one of said image focal planes is provided by the one or more lenses;
the pixelated detector is taller, wider or both taller and wider than the mirror; and
the mirror is mounted on the translation stage.

25. The optical device of claim 24, wherein the translation stage is translatable from a position where it does not occlude the pixelated detector to a position where it partially or completely occludes the pixelated detector.

26. The optical device of claim 24, wherein the translation stage is translatable from a position where it does not occlude the optical fiber to a position where it partially or completely occludes the fiber optical fiber.

27. The optical device of claim 15, comprising one or more further optical fibers, each having an entrance face translatable in the second one of said image focal planes.

28. The optical device of claim 27, wherein all of the optical fibers are connected to a common optical measurement instrument or to different optical measurement instruments.

29. The optical device of claim 15, wherein the translatable stage supports at least one color filter, at least one neutral density filter, or at least one color filter and at least one neutral density filter in front of either or both of the pixelated detector and the optical fiber.

30. The optical device of claim 15, wherein the translation stage translates in two dimensions parallel to the second one of said image focal planes.

31. The optical device of claim 15, wherein a location of the one or more lenses is adjustable depending on a wavelength of light captured by the optical fiber.

32. The optical device of claim 15, comprising a reference light source that directs light into the optical fiber.

33. The optical device of claim 15, comprising, on the translation stage, one or any of: a prism, a beam splitter, clear glass, a thin film filter, an absorbing filter, a polarizing filter, a linear variable bandpass filter, an opaque panel.

34. The optical device of claim 15, comprising a further translation stage on which an exit end of the optical fiber is mounted.

35. The optical device of claim 34, comprising further optical fibers, wherein exit faces of all the optical fibers are mounted on the further translation stage, which translates so that one or some of the exit faces are aligned with a light-limiting aperture, an entrance slit of a spectrometer, a fiber assembly, one of multiple light-limiting apertures, or a further light-limiting aperture that has a lens assembly on one or both sides.

36. The optical device of claim 15, comprising a micro lens mounted on an exit face of the optical fiber.

37. The optical device of claim 15, wherein an exit face of the optical fiber couples to an optical measurement instrument.

38. The optical device of claim 15, wherein the mirror is curved or segmented.

39. A method for calibrating an optical device that comprises:
   one or more lenses providing an image focal plane;
   a mirror providing another image focal plane of the one or more lenses;
   a pixelated detector at a first one of said image focal planes;
   a translation stage that translates parallel to a second one of said image focal planes; and
   an optical fiber mounted on the translation stage so that an entrance face of the optical fiber is translatable in the second one of said image focal planes;
the method comprising:
   focusing the pixelated detector onto a white screen;
   translating the entrance face of the optical fiber to a desired location;
   back-illuminating the optical fiber to illuminate a spot on the white screen;
   applying a mark to the white screen at the illuminated spot;
   translating the entrance face of the optical fiber outside of a field of view of the pixelated detector;
   acquiring an image of the white screen and the mark;
   defining pixels of the pixelated detector that correspond to the mark; and
   recording the defined pixels in association with the desired location.

40. The method of claim 39, wherein the optical device comprises a filter in an optical path from the one or more lenses to the pixelated detector, the method further comprising:
   determining a spectral responsivity of each pixel of the pixelated detector.

41. The method of claim 39, wherein the optical device comprises one or more further optical fibers, the method comprising:
   connecting any of the optical fiber and the further optical fibers to a reference light source after calibration of the optical device.

42. The optical device of claim 2, wherein:
   there is exactly one lens that provides the first image focal plane; and
   the second image focal plane is a focal plane of said exactly one lens.

43. The optical device of claim 2, comprising one or more further optical fibers each having a further entrance face positioned in the second image focal plane.

44. The optical device of claim 5 or 42, wherein said exactly one lens is a compound lens.

45. The optical device of claim 7 or 43, wherein all of the optical fibers are connected to a common optical measurement instrument or to different optical measurement instruments.

* * * * *